United States Patent
Izumi et al.

(10) Patent No.: US 11,784,492 B2
(45) Date of Patent: Oct. 10, 2023

(54) POWER SUPPLY SYSTEM

(71) Applicant: TOYOTA JIDOSHA KABUSHIKI KAISHA, Toyota (JP)

(72) Inventors: Junta Izumi, Nagoya (JP); Kenji Kimura, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/844,900

(22) Filed: Jun. 21, 2022

(65) Prior Publication Data
US 2023/0069509 A1    Mar. 2, 2023

(30) Foreign Application Priority Data

Aug. 24, 2021  (JP) .................................. 2021-136239

(51) Int. Cl.
    *H02J 3/14*     (2006.01)
    *H02J 7/00*     (2006.01)
    *H02M 7/483*    (2007.01)
    *H02J 3/32*     (2006.01)

(52) U.S. Cl.
    CPC ..................... *H02J 3/14* (2013.01);
    *H02J 3/32* (2013.01); *H02J 7/0016* (2013.01);
    *H02J 7/0063* (2013.01); *H02J 7/00712*
    (2020.01); *H02J 7/007194* (2020.01); *H02M*
    *7/483* (2013.01); *H02J 2207/20* (2020.01)

(58) Field of Classification Search
    CPC ........ H02J 7/0063; H02J 3/14; H02J 2207/20;
    H02J 3/32; H02J 7/0016; H02J 7/00712;
    H02J 7/007194; H02J 7/34; H02J 7/342;
    H02J 7/0013; H02J 7/0024; H02J 7/0025;
    Y02E 60/10; H01M 10/441; H02M 7/483
    See application file for complete search history.

(56) References Cited

U.S. PATENT DOCUMENTS 11,424,620 B2 *   8/2022   Juang ...................... H02J 7/007
2011/0254373 A1 * 10/2011  Johnson ................ H02M 7/483
                                                                307/77

FOREIGN PATENT DOCUMENTS

| BE | 1022874 B1 * | 9/2016 |
| JP | 2018-074709 A | 5/2018 |
| KR | 20160028341 A * | 3/2016 |
| WO | 2018/079664 A1 | 5/2018 |

* cited by examiner

*Primary Examiner* — Ryan Johnson
(74) *Attorney, Agent, or Firm* — Oliff PLC

(57) ABSTRACT

A power supply system that outputs AC power to an object to which power is to be supplied includes: a first power supply circuit including a DC battery string and an inverter and configured to output first AC power; a second power supply circuit including an AC battery string and configured to output second AC power; and a control device. In the first mode, power is transferred between the object and the second power supply circuit. In the second mode, power is transferred between the object and each of the first and second power supply circuits. The control device starts supplying the second AC power to the object in the first mode, and when a power supply current becomes larger than a first threshold, supply the first and second AC power to the object in the second mode.

11 Claims, 11 Drawing Sheets

POWER SUPPLY SYSTEM

CROSS-REFERENCE TO RELATED APPLICATION

This application claims priority to Japanese Patent Application No. 2021-136239 filed on Aug. 24, 2021, incorporated herein by reference in its entirety.

BACKGROUND

1. Technical Field

The present disclosure relates to a power supply system, and more particularly to a power supply system using a plurality of battery strings.

2. Description of Related Art

Japanese Unexamined Patent Application Publication No. 2018-074709 (JP 2018-074709 A) discloses a control circuit for controlling a battery string. The battery string includes multiple battery circuit modules connected to each other. Each battery circuit module included in the battery string includes: a battery; a first switch connected in parallel with the battery; a second switch connected in series with the battery; and a first output terminal and a second output terminal to which the voltage of the battery is applied when the first switch is in an electrically disconnected state and the second switch is in an electrically connected state. The control circuit can adjust the output voltage of the battery string to a desired magnitude by controlling the first and second switches of each battery circuit module included in the battery string.

SUMMARY

JP 2018-074709 A discloses a power supply system that outputs direct-current (DC) power using such a battery string mentioned above. However, JP 2018-074709 A does not at all consider outputting a power waveform (alternating-current (AC) power) using the battery string. If a battery string for alternating-current power (hereinafter referred to as "alternating-current battery string (AC battery string)") and a battery string for direct-current power (hereinafter referred to as "direct-current battery string (DC battery string)") can be appropriately used depending on the situation, the battery strings can be used in a wider range of applications, and a low cost on the battery strings can be expected.

The present disclosure provides a power supply system that can output alternating-current power by an appropriate method depending on the situation by using an alternating-current battery string and a direct-current battery string.

A power supply system according to one aspect of the present disclosure is configured to output alternating-current power to an object to which power is to be supplied (hereinafter sometimes simply referred to as "object"). The power supply system includes a first power supply circuit, a second power supply circuit, and a control device. The first power supply circuit includes a direct-current battery string for direct-current power and an inverter that converts direct-current power output from the direct-current battery string to alternating-current power, and the first power supply circuit is configured to output first alternating-current power by the direct-current battery string and the inverter. The second power supply circuit includes an alternating-current battery string for alternating-current power, and the second power supply circuit is configured to output second alternating-current power by the alternating-current battery string. The control device is configured to control the first power supply circuit and the second power supply circuit. The alternating-current battery string and the direct-current battery string each include multiple battery circuit modules connected in series. Each of the battery circuit modules includes a battery, an output terminal that outputs a voltage of the battery, a first switch connected to the output terminal and connected in parallel with the battery, and a second switch connected in series with the battery. Each of the battery circuit modules is configured in such a manner that the voltage of the battery is applied to the output terminal when the first switch is in an electrically disconnected state and the second switch is in an electrically connected state. The control device is configured to switch between a first mode and a second mode. In the first mode, power is transferred between the object and the second power supply circuit, and is not transferred between the object and the first power supply circuit. In the second mode, power is transferred between the object and each of the first power supply circuit and the second power supply circuit. The control device is configured to start supplying the second alternating-current power to the object in the first mode, and when a power supply current becomes larger than a first threshold, switch from the first mode to the second mode and supply the first alternating-current power and the second alternating-current power to the object in the second mode.

According to the above configuration, each of the first power supply circuit and the second power supply circuit can be in charge of power supply that matches its characteristics. Specifically, since the first power supply circuit using the direct-current battery string outputs alternating-current power using the inverter, the efficiency of the first power supply circuit is higher than that of the second power supply circuit, and it is easy for the first power supply circuit to output a large amount of power (kW). On the other hand, the second power supply circuit using the alternating-current battery string can adjust the power waveform without using an inverter by controlling the first and second switches of each battery circuit module in the alternating-current battery string. However, the efficiency of the second power supply circuit is lower than that of the first power supply circuit, and it is difficult for the second power supply circuit to output a large amount of electric power (kW). Therefore, in the above power supply system, the second power supply circuit (including the alternating-current battery string) is in charge of low-rate power supply (that is, power supply with a power supply current equal to or less than the first threshold), and not only the second power supply circuit but also the first power supply circuit (including the direct-current battery string) are in charge of high-rate power supply (that is, power supply with a power supply current larger than the first threshold). Such a power supply system can suitably perform both the low-rate power supply and the high-rate power supply. Typically, the low-rate power supply is performed immediately after the start of power supply, and the power supply current increases gradually. Since the above power supply system does not use the direct-current battery string for the low-rate power supply, degradation of the batteries in the direct-current battery string is reduced.

The first threshold may be expressed in C-rate. The first threshold may be about 1 C, may be 0.5 C or more and less than 1.5 C, or may be 1.5 C or more.

The object to which power is to be supplied may be an external power supply such as power grid, or may be a building. In a mode in which the object is a power grid, the power supply of the power supply system may be performed in a reverse direction (that means, the power supply system supplies power to a power grid). The object may be an electrical wire connecting the external power supply and the building, as will be described later.

In the power supply system according to the above aspect, a power density of the battery included in the direct-current battery string may be higher than a power density of the battery included in the alternating-current battery string. An energy density of the battery included in the alternating-current battery string may be higher than an energy density of the battery included in the direct-current battery string.

In the low-rate power supply, the amount of power (kWh) may become large as the power supply is performed for a long time. The above power supply system uses high capacity batteries (batteries with high energy density) for the low-rate power supply. This makes it easier for the above power supply system to perform such power supply for a long time. The above power supply system uses high power batteries (batteries with high power density) for the high-rate power supply. This makes it easier for the above power supply system to suitably perform the high-rate power supply.

Hereinafter, each battery included in the direct-current battery string is sometimes referred to as "direct-current battery (DC battery)." The power density of the direct-current batteries may be 1000 W/kg or more, 1500 W/kg or more and less than 5000 W/kg, or 5000 W/kg or more. The energy density of the direct-current batteries may be less than 300 Wh/kg, less than 100 Wh/kg, or 50 Wh/kg or more and less than 500 Wh/kg.

Hereinafter, each battery included in the alternating-current battery string is sometimes referred to as "alternating-current battery (AC battery)." The energy density of the alternating-current batteries may be 300 Wh/kg or more, 500 Wh/kg or more and less than 1000 Wh/kg, or 1000 Wh/kg or more. The power density of the alternating-current batteries may be less than 1000 W/kg, or 300 W/kg or more and less than 1000 W/kg.

In the power supply system according to the above aspect, the control device may be configured to set the first threshold based on at least one of a temperature of the battery included in the direct-current battery string and a state of charge (SOC) of the battery included in the direct-current battery string.

The power density of the high-power batteries tends to decrease with battery degradation. According to the above configuration, since degradation of the direct-current batteries is reduced, it is easier to maintain the high power density of the direct-current batteries. Specifically, degradation of the direct-current batteries tends to progress when the direct-current batteries are charged or discharged at high temperatures. Degradation of the direct-current batteries also tends to progress when the direct-current batteries with a high SOC are charged or the direct-current batteries with a low SOC are discharged. The control device sets the first threshold to a higher value when it determines, based on at least one of the temperature and SOC of the direct-current batteries, that the direct-current batteries are likely to degrade. This suppresses degradation of the direct-current batteries. Since the first threshold is set to a higher value, the mode is less likely to switch from the first mode to the second mode, and charging and discharging of the direct-current batteries are less likely to be performed. The above configuration reduces the possibility that charging and discharging of the direct-current batteries may be performed in a situation where the direct-current batteries tend to degrade.

In the power supply system according to the above aspect, the control device may be configured to control at least one of the first power supply circuit and the second power supply circuit according to an external command. When an input and output current value indicated by the external command is smaller than a second threshold, the control device may control the second power supply circuit in the first mode in such a manner that an input and output current value of the second power supply circuit becomes equal to the input and output current value indicated by the external command. When the input and output current value indicated by the external command is larger than the second threshold, the control device may control the first power supply circuit and the second power supply circuit in the second mode in such a manner that a sum of an input and output current value of the first power supply circuit and the input and output current value of the second power supply circuit becomes equal to the input and output current value indicated by the external command.

In the power supply system, the control device performs control as mentioned above when charging or discharging of the batteries included in the first power supply circuit and the second power supply circuit is performed according to the external command. The power supply system can therefore suitably perform both low-rate charging and discharging and high-rate charging and discharging. The second threshold may be the same as or different from the first threshold.

In any of the power supply systems according to the above aspect, the object to which power is to be supplied may be an electrical wire connecting a building and an external power supply that supplies power to the building. The first power supply circuit and the second power supply circuit may each be configured to supply and receive power to and from the external power supply.

According to the above configuration, alternating-current power can be supplied from each of the first power supply circuit and the second power supply circuit to the building. Moreover, since each of the alternating-current batteries and the direct-current batteries can be charged with power from the external power supply, each of the first power supply circuit and the second power supply circuit can store power as necessary. The above power supply system may function as an emergency power supply for the building. The external power supply may be a power grid.

In the power supply system according to the above aspect, the control device may be configured to perform power balancing of the external power supply. The control device may be configured to, when an input and output current of the power supply system is smaller than a third threshold, control the second power supply circuit in the first mode so as to perform the power balancing of the external power supply by input and output power of the second power supply circuit. The control device may be configured to, when the input and output current of the power supply system is larger than the third threshold, control the first power supply circuit and the second power supply circuit in the second mode so as to perform the power balancing of the external power supply by both input and output power of the first power supply circuit and the input and output power of the second power supply circuit.

The control device of the power supply system performs control as mentioned above when performing the power balancing of the external power supply. The power supply system can therefore suitably perform both low-rate power balancing and high-rate power balancing. The third threshold may be the same as or different from the first threshold.

Any of the power supply systems according to the above aspect may further include a first relay located between the first power supply circuit and the object, and a second relay located between the second power supply circuit and the object. The control device may be configured to switch the first relay to an electrically disconnected state and the second relay to an electrically connected state in the first mode, and switch both the first relay and the second relay to the electrically connected state in the second mode.

According to the above configuration, in the first mode, power transfer between the second power supply circuit and the object is permitted, and power transfer between the first power supply circuit and the object is prohibited. In the second mode, power transfer between each of the first power supply circuit and the second power supply circuit and the object is permitted. The first mode and the second mode can thus be appropriately performed.

In the power supply system according to the above aspect, the first power supply circuit may include a first drive circuit and a first control circuit, the first driving circuit driving the first switch and the second switch included in the direct-current battery string, and the first control circuit sending a signal for driving each of the first switch and the second switch to the first drive circuit according to a command from the control device. The second power supply circuit may include a second drive circuit and a second control circuit, the second drive circuit driving the first switch and the second switch included in the alternating-current battery string, and the second control circuit sending a signal for driving each of the first switch and the second switch to the second drive circuit according to a command from the control device.

The above configuration makes it easier to suitably control the alternating-current battery string and the direct-current battery string by the first control circuit and the second control circuit.

In the power supply system according to the above aspect, the inverter may be a three-phase inverter. The control device may be configured to send a command for controlling the direct-current battery string to the first control circuit and control the inverter such that three-phase alternating-current power is output from the first power supply circuit. The alternating-current battery string may include a U-phase battery string, a V-phase battery string, and a W-phase battery string that are Y-connected. The control device may be configured to send a command for controlling the U-phase battery string, the V-phase battery string, and the W-phase battery string to the second control circuit such that three-phase alternating-current power is output from the second power supply circuit.

According to the above configuration, three-phase alternating-current power can be output from each of the first power supply circuit and the second power supply circuit. The voltage of the three-phase alternating-current power may be 190 V or more and 300 V or less, or may be 200 V.

Any of the power supply systems according to the above aspect may further include an insulation filter located between the first power supply circuit and the object. The inverter may be a reused product used for a different purpose.

In a mode in which the inverter is a reused product, a desired alternating-current power waveform is not necessarily obtained by the inverter. In the above configuration, the insulation filter is therefore provided between the first power supply circuit and the object. The use of such an insulation filter makes it easier to obtain a desired alternating-current power waveform and to reduce noise contained in the output (alternating-current power) of the first power supply circuit.

For example, a reused product used as a traction inverter in an electrified vehicle (xEV) (that is, an inverter removed from an xEV after use) can be used as the inverter. The traction inverter is, for example, an inverter that drives a traction motor in an xEV. Electrified vehicles (xEVs) are vehicles that use electric power as all or part of their power source. Electrified vehicles (xEVs) include battery electric vehicles (BEVs), plug-in hybrid electric vehicles (PHEVs), and fuel cell electric vehicles (FCEVs).

In the power supply system according to the above aspect, the first drive circuit and the second drive circuit may each include a delay circuit that delays the signal. Delay time of the signal that is provided by the delay circuit may be set by the control device.

The present disclosure provides a power supply system that can output alternating-current power by an appropriate method depending on the situation by using an alternating-current battery string and a direct-current battery string.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, an embodiment of the present disclosure will be described in detail with reference to the drawings. The same or corresponding portions are denoted by the same signs throughout the drawings, and description thereof will not be repeated. Hereinafter, a string control unit is referred to as "SCU." A group control unit is referred to as "GCU." An alternating current is sometimes referred to as "AC," and a direct current is sometimes referred to as "DC."

Figure 1:
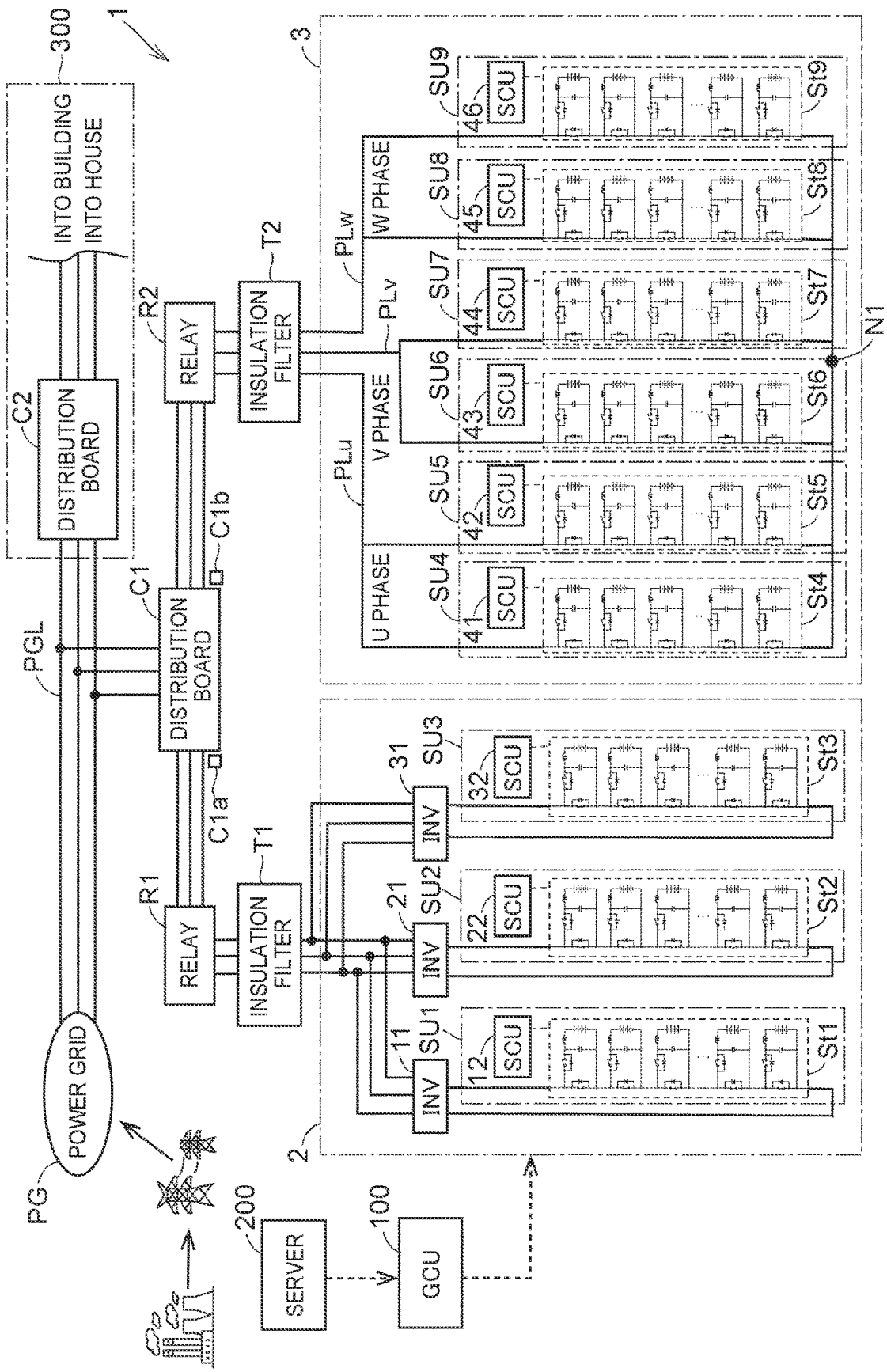
FIG. 1 shows a configuration of a power supply system according to an embodiment of the present disclosure.

FIG. 1 shows a configuration of a power supply system according to an embodiment. A power supply system 1 includes a first power supply circuit 2, a second power supply circuit 3, insulation filters T1, T2, relays R1, R2, a distribution board C1, and a GCU 100. The GCU 100 is an example of the "control device" according to the present disclosure. The GCU 100 may be a computer. The GCU 100 includes, for example, a processor, a random access memory (RAM), and a storage device (none of which are shown). The GCU 100 performs various processes by the processor executing programs stored in the storage device. However, the various processes of the GCU 100 need not necessarily be performed by software, and may be performed by dedicated hardware (electronic circuit). In the present embodiment, the power supply system 1 is applied to a building 300 such as house, school, hospital, commercial facility, or train station.

A power grid PG supplies electric power to the building 300 through electrical wires PGL. The power grid PG is a power network constituted by power transmission and distribution equipment. A plurality of power plants is connected to the power grid PG. Electric power is supplied from the power plants to the power grid PG. In the present embodiment, an electric power company maintains and manages the power grid PG (commercial power grid). The electric power company is a general power transmission and distribution business operator. The power grid PG supplies three-phase AC power to the building 300. The power grid PG is an example of the "external power supply" according to the present disclosure. A server 200 manages the supply and demand situation of the power grid PG. The server 200 is configured to communicate with the GCU 100. In the present embodiment, the server 200 belongs to the electric power company. However, the present disclosure is not limited to this, and the server 200 may be a server that belongs to an aggregator, or may be a server that trades electricity in a power market (e.g., a supply and demand balancing market).

Each of the first power supply circuit 2 and the second power supply circuit 3 is configured to supply and receive electric power to and from the power grid PG. Each of the first power supply circuit 2 and the second power supply circuit 3 sometimes receives electric power supplied from the power grid PG, and sometimes supplies electric power to the power grid PG. Each of the first power supply circuit 2 and the second power supply circuit 3 is electrically connected to the electrical wires PGL (electrical wires connecting the power grid PG and the building 300) via the distribution board C1. The relay R1 and the insulation filter T1 are provided between the electrical wires PGL and the first power supply circuit 2 (more specifically, between the distribution board C1 and the first power supply circuit 2). The relay R2 and the insulation filter T2 are provided between the electrical wires PGL and the second power supply circuit 3 (more specifically, between the distribution board C1 and the second power supply circuit 3). The relays R1, R2 are examples of the "first relay" and the "second relay" according to the present disclosure, respectively.

The distribution board C1 includes an earth leakage circuit breaker and/or a breaker. The distribution board C1 is provided with power sensors C1a, C1b. The power sensor C1a includes a current sensor that detects a current (input and output current) flowing between the first power supply circuit 2 and the electrical wires PGL, and a voltage sensor that detects an input and output voltage of the first power supply circuit 2. The power sensor C1b includes a current sensor that detects a current (input and output current) flowing between the second power supply circuit 3 and the electrical wires PGL, and a voltage sensor that detects an input and output voltage of the second power supply circuit 3. The power sensors C1a, C1b output their detection results to the GCU 100. The distribution board C1 may further include an electricity meter (not shown).

A distribution board C2 installed in the building 300 is configured to receive electric power supplied from each of the power grid PG and the power supply system 1. The distribution board C2 is connected to indoor wires and distributes power supplied from at least one of the power grid PG and the power supply system 1 to the indoor wires.

The first power supply circuit 2 includes battery strings St1, St2, and St3, inverters 11, 21, and 31, and SCUs 12, 22, and 32. The second power supply circuit 3 includes battery strings St4 to St9 and SCUs 41 to 46. Each battery string included in the first power supply circuit 2 and the second power supply circuit 3 forms a sweep unit SU.

Figure 2:
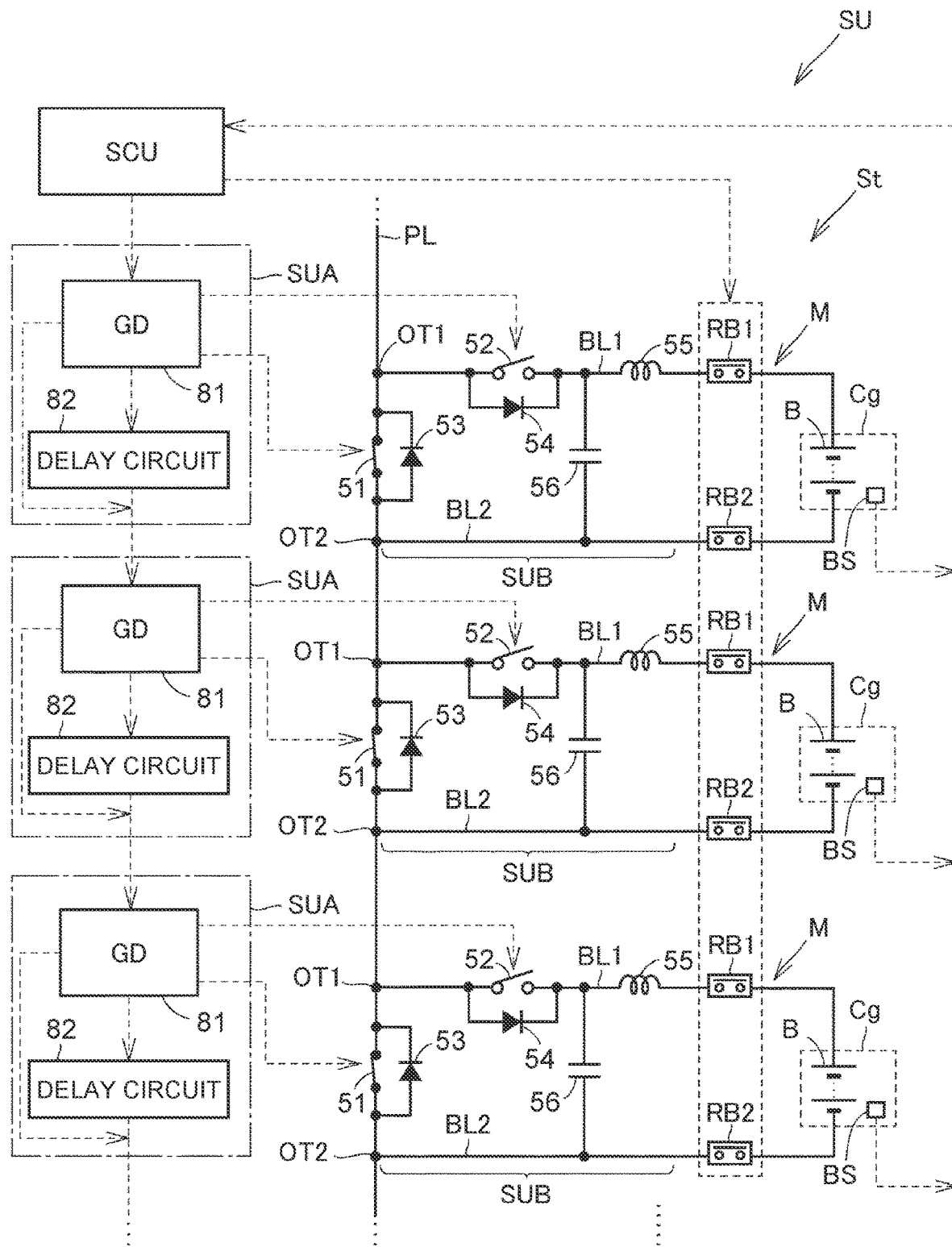
FIG. 2 shows a configuration of each sweep unit included in the power supply system shown in FIG. 1.

FIG. 2 shows a configuration of the sweep unit SU. Referring to FIG. 2 together with FIG. 1, in the power supply system 1 according to the present embodiment, the sweep units SU are mounted on each of the first power supply circuit 2 and the second power supply circuit 3. The sweep unit SU is a module composed of: a battery string St (corresponding to the battery strings St1 to St9 shown in FIG. 1); a plurality of drive circuits SUA (not shown in FIG. 1) that drives switches (SW 51, SW 52 that will be described later) in the battery string St; and an SCU (corresponding to the SCUs 12, 22, 32, and 41 to 46 shown in FIG. 1) that sends a control signal to the drive circuits SUA. The drive circuits SUA may be formed on and integrated to one substrate. The sweep unit SU may be one circuit board.

The battery string St includes multiple battery circuit modules M connected in series. In the present embodiment, the battery string St includes about 20 battery circuit modules M. However, the battery string St may include any number of battery circuit modules M. The battery string St may include 5 to 50 battery circuit modules M, or may include 100 or more battery circuit modules M. In the present embodiment, each battery string St in the first power supply circuit 2 and the second power supply circuit 3 includes the same number of battery circuit modules M. However, the number of battery circuit modules M may be different for each battery string St.

Each battery circuit module M includes a power circuit SUB and a cartridge Cg. The cartridge Cg includes a battery B and a monitoring unit BS. The battery circuit module M including the battery B is formed by connecting the power circuit SUB and the battery B. The drive circuit SUA is provided for each battery circuit module M. The drive circuit SUA is configured to drive the switches included in the battery circuit module M (more specifically, SW 51 and SW 52 which will be described later). The battery B will be described in detail later. In the present embodiment, different types of batteries are used for the first power supply circuit 2 and the second power supply circuit 3.

As shown in FIG. 2, each battery circuit module M further includes circuit breakers RB1, RB2 (hereinafter referred to as "circuit breakers RB" when not individually identified). The power circuit SUB and the cartridge Cg are connected to each other via the circuit breakers RB1, RB2. The SCU is configured to switch the connection state (electrically connected or disconnected) between the power circuit SUB and the cartridge Cg by controlling ON and OFF of each circuit breaker RB according to a control command from the GCU 100. The circuit breaker RB may be an electromagnetic mechanical relay. The circuit breaker RB may be configured to be manually turned on and off by a user.

In the present embodiment, the cartridge Cg is detachable from the power circuit SUB. For example, the user may remove the cartridge Cg from the power circuit SUB when the circuit breakers RB1, RB2 are in the OFF state (electrically disconnected state). Since the battery string St can operate even when there is an empty cartridge, the user can easily increase or decrease the number of cartridges Cg in the battery string St. Such a battery string St is suitable for battery reuse.

The monitoring unit BS of the cartridge Cg is configured to detect the state of the battery B (e.g., voltage, current, and temperature) and output the detection results to the SCU. The monitoring unit BS includes a voltage sensor that detects the voltage of the battery B, a current sensor that detects the current of the battery B, and a temperature sensor that detects the temperature of the battery B. The monitoring unit BS may be a battery management system (BMS) having a state of charge (SOC) estimation function, a state of health (SOH) estimation function, a battery voltage equalization function, a diagnostic function, and a communication function, in addition to the above sensor functions. The SCU acquires the state of each battery B (e.g., temperature, current, voltage, SOC, and internal resistance) based on the output of each monitoring unit BS, and outputs the acquired state of each battery B to the GCU 100. The SOC indicates the remaining capacity of the battery B. For example, the SOC is the ratio of the current capacity to the capacity in the fully charged state and varies between 0% and 100%.

The battery circuit modules M included in the battery string St are connected by a common electrical wire PL. The electrical wire PL includes output terminals OT1, OT2 of each battery circuit module M. The output terminal OT2 of a battery circuit module M is connected to the output terminal OT1 of its adjacent battery circuit module M. The battery circuit modules M included in the battery string St are thus connected to each other.

The power circuit SUB includes a first switching element 51 (hereinafter referred to as "SW 51"), a second switching element 52 (hereinafter referred to as "SW 52"), a first diode 53, a second diode 54, a choke coil 55, a capacitor 56, and output terminals OT1, OT2. Each of the SW 51 and the SW 52 is driven by the drive circuit SUA. The SW 51 and the SW 52 according to the present embodiment are examples of the "first switch" and the "second switch" according to the present disclosure, respectively.

The SW 51, the capacitor 56, and the battery B are connected in parallel between the output terminals OT1, OT2 of the power circuit SUB. The SW 51 is located on the electrical wire PL and is configured to switch the connection state (electrically connected or disconnected) between the output terminal OT1 and the output terminal OT2. The output terminal OT1 is connected to a positive electrode of the battery B via an electrical wire BL1, and the output terminal OT2 is connected to a negative electrode of the battery B via an electrical wire BL2. The circuit breakers RB1, RB2 are provided on the electrical wires BL1, BL2, respectively. The SW 52 and the choke coil 55 are also provided on the electrical wire BL1. In the battery circuit module M, the voltage of the battery B is applied between the output terminals OT1, OT2 when the SW 52 connected in series with the battery B is in the ON state (electrically connected state) and the SW 51 connected in parallel with the battery B is in the OFF state (electrically disconnected state).

The capacitor 56 connected to the electrical wires BL1, BL2 is provided between the battery B and the output terminals OT1, OT2. One end of the capacitor 56 is connected to the electrical wire BL1 at a position between the SW 52 and the choke coil 55. The capacitor 56 smooths the voltage of the battery B and outputs the smoothed voltage between the output terminals OT1, OT2.

Each of the SW 51 and the SW 52 is, for example, a field effect transistor (FET). The first diode 53 and the second diode 54 are connected in parallel with the SW 51 and the SW 52, respectively. The SW 52 is located between the output terminal OT1 and the choke coil 55. The choke coil 55 is located between the SW 52 and the positive electrode of the battery B. The battery B, the choke coil 55, and the capacitor 56 form an RCL filter. The RCL filter performs current leveling. Each of the SW 51 and the SW 52 is not limited to the FET and may be a switch other than the FET.

The SCU sends a signal for driving each of the SW 51 and the SW 52 to the drive circuit SUA according to a command from the GCU 100. Specifically, the SCU generates a gate signal according to a control command from the GCU 100. This gate signal corresponds to the signal for driving each of the SW 51 and the SW 52 according to a command from the GCU 100. The SCU then sends the gate signal to the drive circuit SUA. The drive circuit SUA includes a gate driver (GD) 81 that drives the SW 51 and the SW 52 according to the gate signal, and a delay circuit 82 that delays the gate signal. Each of the SW 51 and the SW 52 included in the battery circuit module M is controlled ON and OFF according to the gate signal.

Figure 3:
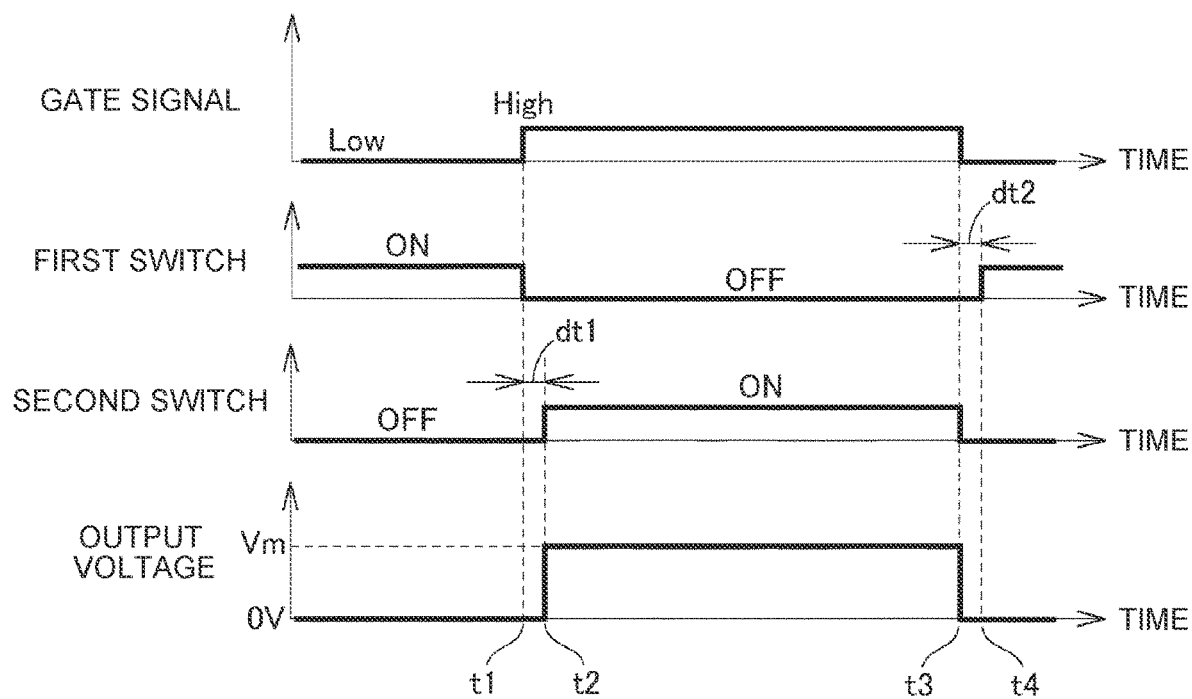
FIG. 3 is a timing chart showing an example of the operation of a battery circuit module that is controlled by a gate signal in the sweep unit shown in FIG. 2.

FIG. 3 is a timing chart showing an example of the operation of the battery circuit module M that is controlled by the gate signal. In the present embodiment, a rectangular wave signal is used as the gate signal for driving the SW 51 (first switch) and the SW 52 (second switch). "Low" and "High" of the gate signal shown in FIG. 3 mean L level and H level of the gate signal (rectangular wave signal), respectively. The "output voltage" refers to a voltage that is output between the output terminals OT1, OT2.

In the initial state of the battery circuit module M, no gate signal is input to the drive circuit SUA (gate signal is at L level), and the SW 51 and the SW 52 are in the ON state and the OFF state, respectively. When the gate signal is input to the drive circuit SUA, the GD 81 drives the SW 51 and the SW 52 according to the received gate signal. In the example shown in FIG. 3, the gate signal rises from L level to H level at time t1, and the SW 51 switches from the ON state to the OFF state at the same time as the rise of the gate signal. The SW 52 switches from the OFF state to the ON state at time t2, the time t2 being a time delayed by a predetermined amount of time (hereinafter referred to as "dt1") from the rise of the gate signal. As a result, the battery circuit module M switches to the operating state. Hereinafter, the period of time from the rise of the gate signal to elapse of dt1 is sometimes referred to as "first delay period".

Figure 4:
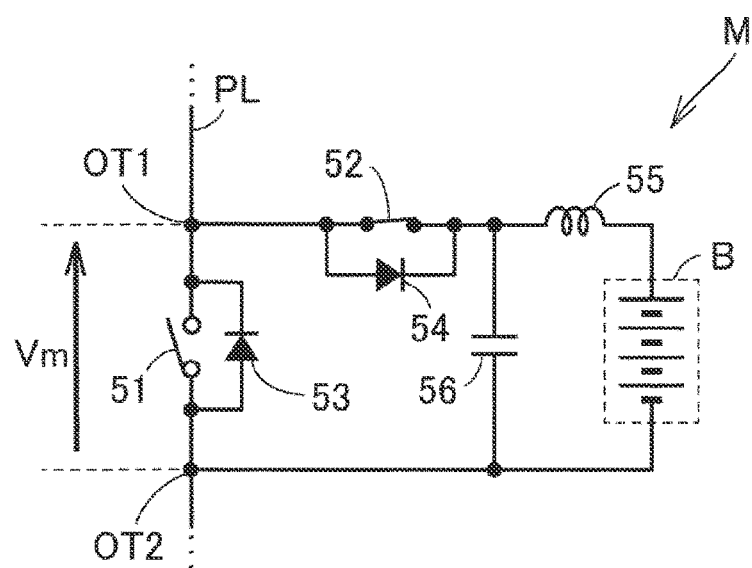
FIG. 4 shows the battery circuit module in an operating state in the sweep unit shown in FIG. 2.

FIG. 4 shows the battery circuit module M in the operating state. Referring to FIG. 4, in the battery circuit module M in the operating state, the voltage of the battery B is applied between the output terminals OT1, OT2 as the SW 51 is in the OFF state and the SW 52 is in the ON state. As the voltage of the battery B is applied between the output terminals OT1, OT2 via the capacitor 56, a voltage Vm is output between the output terminals OT1, OT2.

Referring back to FIG. 3, when the gate signal falls from H level to L level at time t3, the SW 52 switches from the ON state to the OFF state at the same time as the fall of the gate signal. As a result, the battery circuit module M switches to the stopped state. In the battery circuit module M in the stopped state, as the SW 52 is in the OFF state, the voltage of the battery B is not applied between the output terminals OT1, OT2. The SW 51 then switches from the OFF state to the ON state at time t4, the time t4 being delayed by a predetermined amount of time (hereinafter referred to as "dt2") from the fall of the gate signal. The values dt1, dt2 may be the same, or may be different from each other. In the present embodiment, dt1 and dt2 are 100 nanoseconds. However, dt1 and dt2 can be set as desired.

Hereinafter, the period of time from the fall of the gate signal to elapse of dt2 is sometimes referred to as "second delay period". The period from the end of the second delay period until the battery circuit module M switches to the operating state is sometimes referred to as "stop period".

Figure 5:
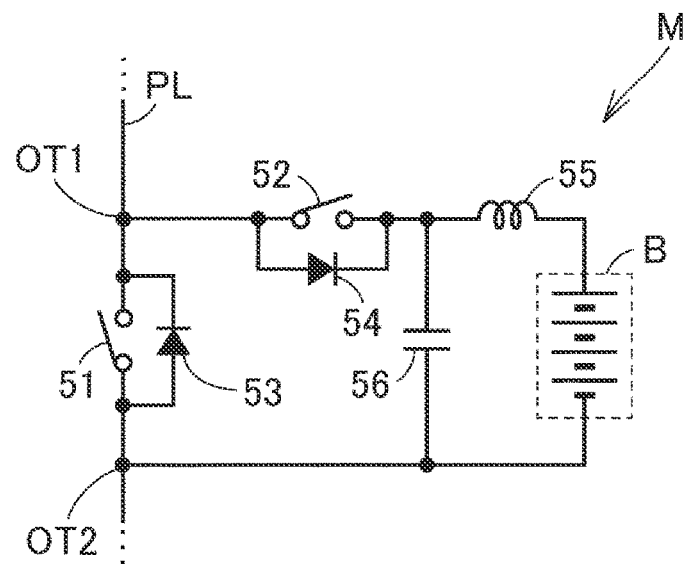
FIG. 5 shows a state of the battery circuit module during a delay period in the sweep unit shown in FIG. 2.

FIG. 5 shows the state of the battery circuit module M during the delay period. As shown in FIG. 5, both the SW 51 and the SW 52 are in the OFF state during both the first delay period and the second delay period.

Figure 6:
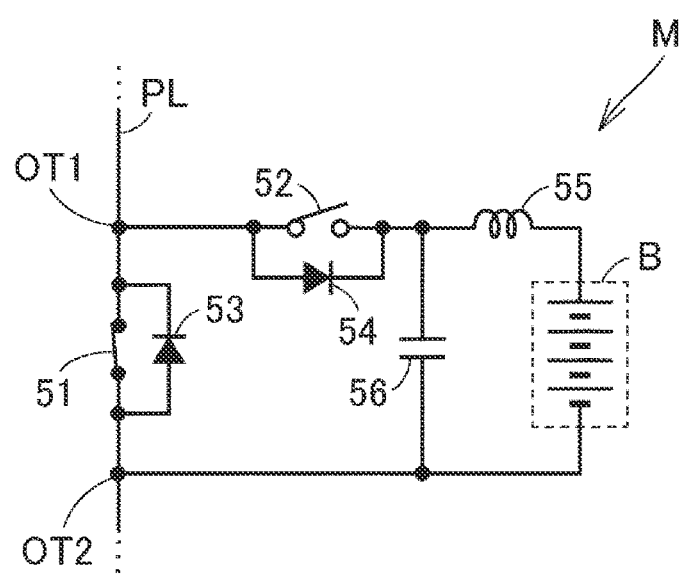
FIG. 6 shows a state of the battery circuit module during a stop period in the sweep unit shown in FIG. 2.

FIG. 6 shows the state of the battery circuit module M during the stop period. As shown in FIG. 6, the SW 51 is in the ON state and the SW 52 is in the OFF state during the stop period, as in the initial state.

The battery circuit module M is in the stopped state during both the delay period and the stop period. In the battery circuit module M in the stopped state, no voltage is applied between the output terminals OT1, OT2. Providing the first delay period and the second delay period reduces the possibility that both the SW 51 and the SW 52 may be in the ON state at the same time (that is, the possibility that the battery circuit module M may be short-circuited).

The battery string St is configured to output a voltage from 0 V to the total voltage of the batteries B included in the battery string St. In the sweep unit SU, the SCU can control the output voltage of the battery string St by adjusting the number of battery circuit modules M that are in the operating state at the same time. In the present embodiment, the SCU controls the voltage of the battery string St by sweep control.

Figure 7:
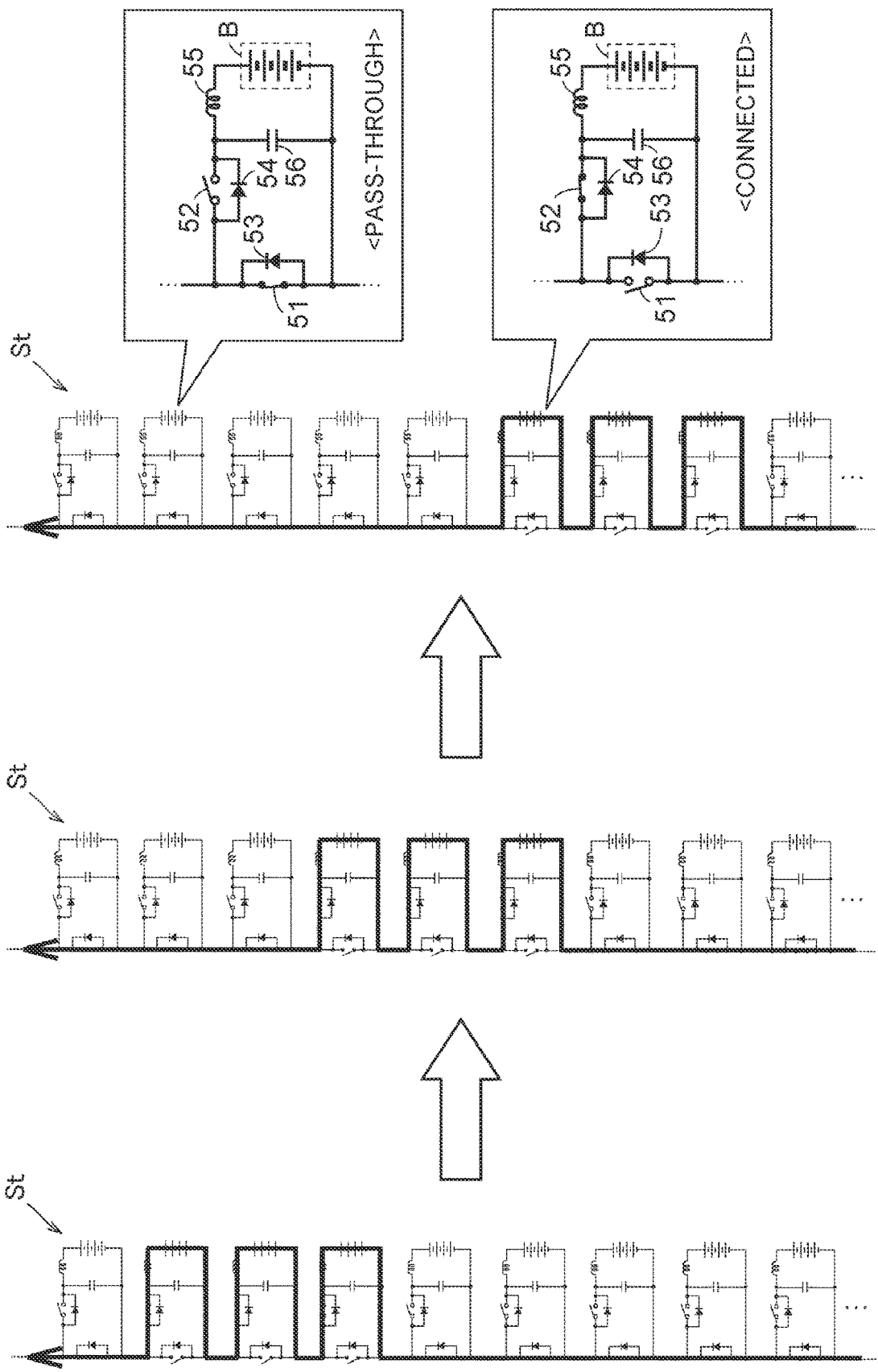
FIG. 7 illustrates an example of sweep control that is performed in the sweep unit shown in FIG. 2.

FIG. 7 illustrates an example of the sweep control. Referring to FIG. 7 together with FIGS. 2 and 3, in the battery string St that is sweep controlled, a predetermined number of batteries B (three in the example shown in FIG. 7) are connected to the circuit, and the remaining batteries B are disconnected from the circuit. In the battery circuit module M, when the SW 51 is in the OFF state and the SW 52 is in the ON state, the battery B is connected to the circuit and the voltage of the battery B is applied to the circuit. The battery circuit module in connected state is shown on the lower side at the right of FIG. 7. In the battery circuit module M, when the SW 51 is in the ON state and the SW 52 is in the OFF state, the battery B is disconnected from the circuit, and the voltage of the battery B is not applied to the circuit (pass-through, the battery circuit module in pass-through state is shown on the upper side at the right of FIG. 7). In the sweep control, the predetermined number of batteries B (three in the example shown in FIG. 7) are always simultaneously connected to the circuit while the individual batteries B connected to the circuit are switched. The sweep unit SU performs the sweep control by sending the gate signal shown in FIG. 3 from one end (upstream end) to the other end (downstream end) of the battery string St while delaying it. The gate signal is delayed by the delay circuit 82.

The GD 81 drives the SW 51 and the SW 52 according to the gate signal. Therefore, the battery B located downstream is connected to the circuit later than the battery B located upstream. For example, as shown in FIG. 7, the current and SOC are equalized among the batteries B in the battery string St by sequentially connecting the batteries B in the battery string St. The GCU 100 sets the delay time that is provided by each delay circuit 82. The delay time may be set to zero (no delay). For example, when the delay times of all the delay circuits 82 in the sweep unit SU are set to zero, all the batteries B are switched to the connected state or the pass-through state at the same time.

The GCU 100 may control the input and output of the battery string St based on the period and duty cycle (ratio of the H level duration to the period) of the gate signal. The GCU 100 can select between connection to the circuit and disconnection from the circuit for each cartridge Cg (battery B) in the battery string St. A disconnection instruction is sent from the GCU 100 to the SCU. The GD 81 instructed by the SCU to disconnect the corresponding battery B from the circuit may maintain the pass-through state of the corresponding battery B regardless of the gate signal. The SCU may disconnect the battery B from the circuit by switching the circuit breakers RB1, RB2 to the OFF state. The GCU 100 may adjust the load sharing of each battery B according to the capacity (or SOC) of each battery B. The GCU 100 may prohibit discharging or charging of a specific battery B based on the SOC of each battery B. For example, the GCU 100 may prohibit discharging of the battery B that has a possibility to be over-discharged, or may prohibit charging of the battery B that has a possibility to be over-charged. The GCU 100 may diagnose degradation of a predetermined battery B in the battery string St using a constant load. The GCU 100 may keep a broken battery B (or a battery B with a high degree of degradation) disconnected from the circuit (see FIG. 6) in order to prohibit the use of that battery B.

The number of sweep units SU included in each of the first power supply circuit 2 and the second power supply circuit 3 shown in FIG. 1 corresponds to the number of battery strings St included in each of the first power supply circuit 2 and the second power supply circuit 3. Specifically, the first power supply circuit 2 includes three sweep units SU (hereinafter referred to as "SU1," "SU2," and "SU3") corresponding to the battery strings St1 to St3. The SCUs 12, 22, and 32 together with the respective battery strings St1, St2, and St3 form the sweep units SU1, SU2, and SU3, respectively. The battery string St, drive circuits, and SCU of each sweep unit SU in the first power supply circuit 2 are examples of the "DC battery string," the "first drive circuit," and the "first control circuit" according to the present disclosure, respectively. The second power supply circuit 3 includes six sweep units SU (hereinafter referred to as "SU4" to "SU9") corresponding to the battery strings St4 to St9. The SCUs 41, 42, 43, 44, 45, and 46 together with the respective battery strings St4, St5, St6, St7, St8, and St9 form the sweep units SU4, SU5, SU6, SU7, SU8, and SU9, respectively. The battery string St, drive circuits, and SCU of each sweep unit SU in the second power supply circuit 3 are examples of the "AC battery string," the "second drive circuit," and the "second control circuit" according to the present disclosure, respectively.

By controlling the sweep units SU1 to SU3, the GCU 100 can cause each of the battery strings St1 to St3 to output DC power with a desired voltage (power with a constant voltage). The GCU 100 may determine the output voltage (DC power voltage) of each of the battery strings St1 to St3 based on information acquired from the user or the server 200. By controlling the sweep units SU4 to SU9, the GCU 100 can cause each of the battery strings St4 to St9 to output AC power (power whose voltage changes periodically in magnitude) with a desired voltage waveform. The GCU 100 may determine the output voltage waveform of each of the battery strings St4 to St9 based on information acquired from the user or the server 200. The user may input a power supply condition and/or a charge condition to the GCU 100.

In the present embodiment, high power batteries are used as the DC batteries (batteries B) in the DC battery strings (battery strings St1, St2, and St3). Specifically, nickel metal hydride batteries with a power density of 1500 W/kg or more and less than 5000 W/kg and an energy density of 50 Wh/kg or more and less than 500 Wh/kg are used as the DC batteries. High capacity batteries are used as the AC batteries (batteries B) in the AC battery strings St (battery strings St4 to St9). Specifically, lithium-ion batteries with a power density of 300 W/kg or more and less than 1000 W/kg and an energy density of 500 Wh/kg or more and less than 1000 Wh/kg are used as the AC batteries. However, different kinds of lithium-ion batteries are used in the battery strings St4, St6, and St8 and the battery strings St5, St7, and St9. Ternary (lithium nickel manganese cobalt oxide (NMC)) lithium-ion batteries are used as the batteries B in the battery strings St4, St6, and St8. Lithium iron phosphate (LFP) lithium-ion batteries are used as the batteries B in the battery strings St5, St7, and St9.

However, the kind (e.g., structure and material) and characteristics (e.g., power density and energy density) of the battery are not limited to those described above, and can be changed as appropriate. For example, power (high power) batteries and energy (high capacity) batteries are sometimes defined based on a Ragone plot with the power density (W/kg) on the ordinate and the energy density (Wh/kg) on the abscissa. Batteries classified as high power batteries by the Ragone plot may be used as DC batteries, and batteries classified as high capacity batteries by the Ragone plot may be used as AC batteries. A plurality of kinds of secondary batteries may be used in one battery string. The battery B may be a lithium-air battery, a lead-acid battery, a sodium-sulfur (NAS) battery, a redox flow battery, or an all-solid-state battery. The battery B may be manufactured by reusing secondary batteries used in xEVs, specifically by connecting the secondary batteries used in xEVs in series.

In the first power supply circuit 2, the DC power output from the battery strings St1, St2, and St3 is input to the inverters 11, 21, and 31, respectively. Hereinafter, the configuration of the inverters included in the first power supply circuit 2 will be described with reference to FIGS. 1 and 8. Since the inverters 11, 21, and 31 have the same configuration, the configuration of the inverter 11 will be described below as a representative example.

Figure 8:
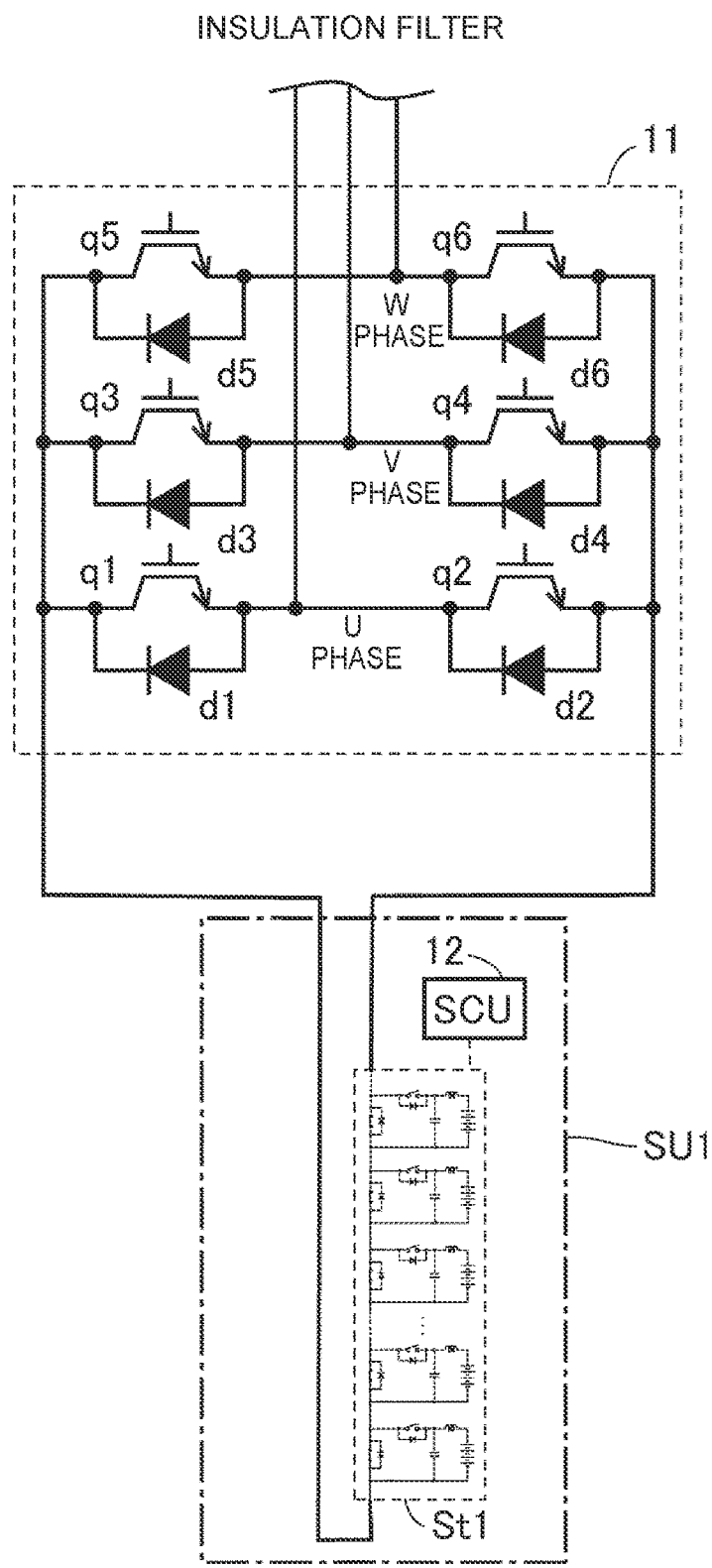
FIG. 8 shows a detailed configuration of an inverter shown in FIG. 1.

FIG. 8 shows a configuration of the inverter included in the first power supply circuit 2. Referring to FIG. 8 together with FIG. 1, the inverter 11 is a three-phase inverter, and includes switching elements q1, q2 connected in series with a U-phase arm, switching elements q3, q4 connected in series with a V-phase arm, and switching elements q5, q6 connected in series with a W-phase arm. Diodes d1 to d6 are connected in antiparallel between the collector and emitter of the switching elements q1 to q6, respectively. In the present embodiment, a three-phase inverter used to drive a three-phase synchronous motor of an xEV is reused as the inverter 11. The inverter 11 is configured to convert power in both directions.

An intermediate point of each phase arm of the inverter 11 is connected to the insulation filter T1 and is further connected to the electrical wires PGL via the relay R1 and the distribution board C1 (see FIG. 1). The switching elements q1 to q6 of the inverter 11 are controlled by control commands from the GCU 100. Each switching element of the inverter 11 is turned on and off by, for example, pulse width modulation (PWM) control.

The inverter 11 converts the DC power output from the battery string St1 to AC power (three-phase AC power) and supplies the AC power to the electrical wires PGL. The inverter 11 functions as a DC-AC converter circuit. The AC power output from the inverter 11 is supplied to the electrical wires PGL via the insulation filter T1, the relay R1, and the distribution board C1. By controlling the SWs 51, 52 of each battery circuit module M in the battery string St1, the sweep unit SU1 can output power from any desired one(s) of the batteries B in the battery string St1. The sweep unit SU1 outputs power from a designated battery/designated batteries B to the inverter 11 according to, for example, a command from the GCU 100. The sweep units SU2, SU3 also output power from the batteries B in the battery strings St2, St3 to the inverters 21, 31, respectively, in a manner similar to that described above. The GCU 100 is configured to send commands to control the battery strings St1, St2, and St3 to the SCUs 12, 22, and 32 and control the inverters 11, 21, and 31 so that three-phase AC power is output from the first power supply circuit 2.

The inverter 11 converts the AC power (three-phase AC power) received from the power grid PG through the electrical wires PGL, the distribution board C1, the relay R1, and the insulation filter T1 to DC power and outputs the DC power to the battery string St1. The sweep unit SU1 can charge the batteries B in the battery string St1 with the DC power supplied from the inverter 11. At this time, the GCU 100 controls the sweep unit SU1 so that the voltage of the battery string St1 becomes slightly lower than the AC voltage supplied from the power grid PG. By controlling the SWs 51, 52 of each battery circuit module M in the battery string St1, the sweep unit SU1 can charge any desired one(s) of the batteries B in the battery string St1. The sweep unit SU1 charges a designated battery B according to, for example, a command from the GCU 100. The sweep units SU2, SU3 also charge the batteries B in the battery strings St2, St3, respectively, in a manner similar to that described above. The GCU 100 is configured to send commands to control the battery strings St1, St2, and St3 to the SCUs 12, 22, and 32 and control the inverters 11, 21, and 31 so that predetermined batteries B in the battery strings St1, St2, and St3 are charged.

As shown in FIG. 1, the inverters 11, 21, and 31 are connected in parallel with the insulation filter T1. Specifically, intermediate points (see FIG. 8) of the three phase arms of the inverters 11, 21, and 31 are connected to the insulation filter T1 by electrical wires. The first power supply circuit 2 outputs three-phase AC power (first AC power) using inverters 11, 21, and 31 and the battery strings St1, St2, and St3 that are connected in parallel. In the present embodiment, the first power supply circuit 2 includes three DC battery strings (battery strings St1, St2, and St3) connected in parallel. The larger the number of DC battery strings connected in parallel, the easier it is to stabilize the AC power waveform output from the first power supply circuit 2. The number of DC battery strings in the first power supply circuit 2 is not limited to three, and can be changed as appropriate. The first power supply circuit 2 may include one DC battery string, or may include four or more DC battery strings. The first power supply circuit 2 may be configured to output single-phase AC power.

Figure 9:
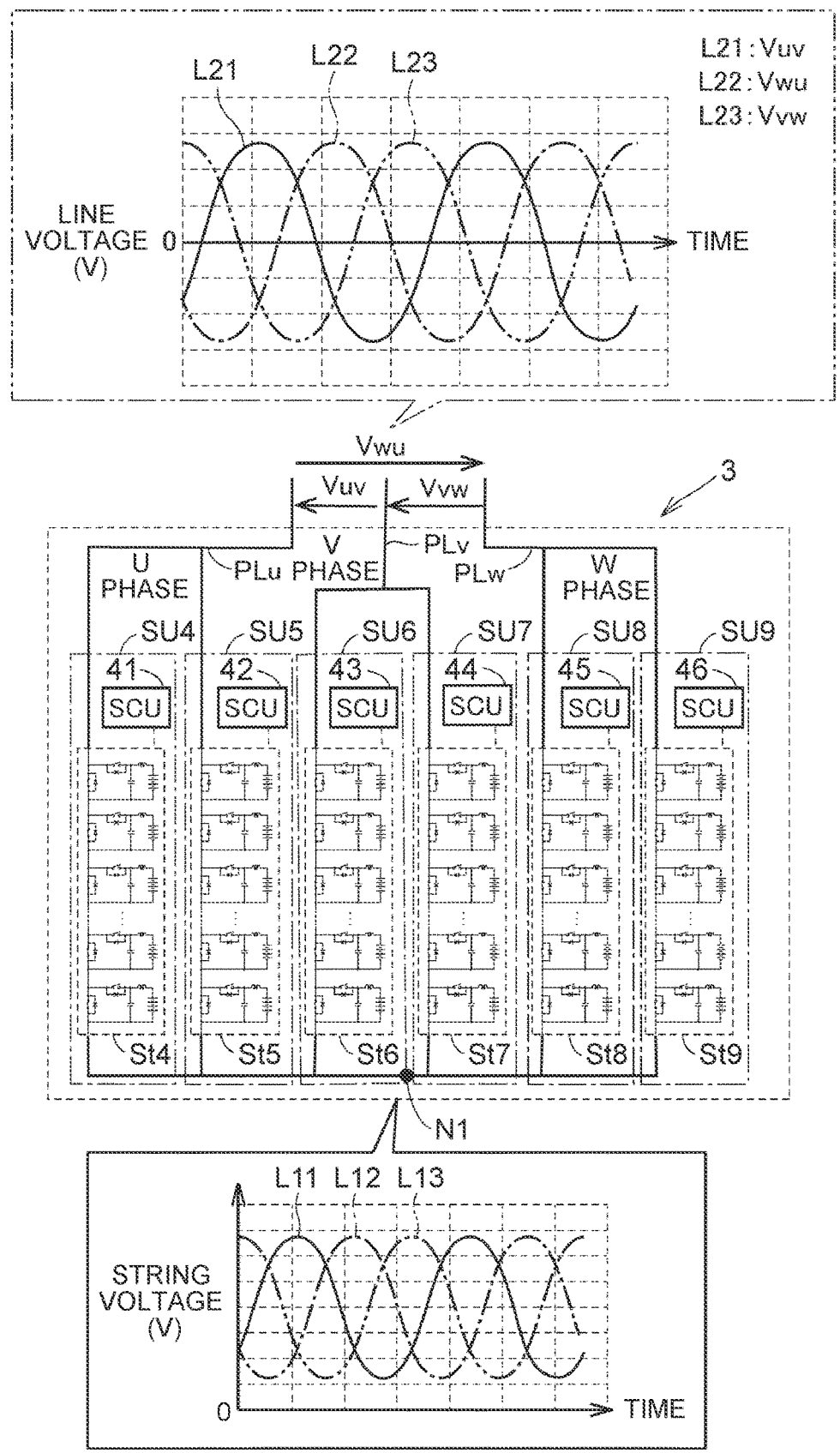
FIG. 9 shows a configuration of a second power supply circuit.

FIG. 9 shows a configuration of the second power supply circuit 3. Referring to FIG. 9, the battery strings St4, St5, St6, St7, St8, and St9 correspond to a first U-phase battery string, a second U-phase battery string, a first V-phase battery string, a second V-phase battery string, a first W-phase battery string, and a second W-phase battery string, respectively.

A positive terminal of the battery string St4 and a positive terminal of the battery string St5 are connected to an electrical wire PLu. A positive terminal of the battery string St6 and a positive terminal of the battery string St7 are connected to an electrical wire PLv. A positive terminal of the battery string St8 and a positive terminal of the battery string St9 are connected to an electrical wire PLw. Negative terminals of the battery strings St4 to St9 are connected to a neutral point N1. In the second power supply circuit 3, the battery strings St4, St5 connected in parallel, the battery strings St6, St7 connected in parallel, and the battery strings St8, St9 connected in parallel are Y-connected.

The SCUs 41 to 46 control the SW 51, SW 52 of each battery circuit module M shown in FIG. 2 at a switching frequency of several tens of kilohertz according to control commands from the GCU 100 to control the string voltages (output voltages) of the battery strings St4 to St9 so that these string voltages have voltage waveforms shown at the bottom of FIG. 9. In FIG. 9, line L11 represents the string voltage of the U-phase battery strings (battery strings St4, St5). Line L12 represents the string voltage of the V-phase battery strings (battery strings St6, St7). Line L13 represents the string voltage of the W-phase battery strings (battery strings St8, St9). Lines L11, L12, and L13 are sine waves that are 120° apart in phase, and their frequency is a frequency corresponding to the power grid PG (e.g., 60 Hz).

As the string voltages of the battery strings St4 to St9 are controlled as described above, the line voltages of the electrical wires PLu, PLv, and PLw have voltage waveforms shown at the top of FIG. 9. In FIG. 9, line L21 represents the line voltage "Vuv" between the electrical wires PLu and PLv, line L22 represents the line voltage "Vwu" between the electrical wires PLw and PLu, and line L23 represents the line voltage "Vvw" between the electrical wires PLv and PLw. Each line voltage has a sinusoidal AC waveform that periodically changes in polarity (positive or negative).

As described above, the second power supply circuit 3 outputs three-phase AC power (second AC power) using the battery strings St4 to St9. In the second power supply circuit 3, the U-phase battery strings (battery strings St4, St5), the V-phase battery strings (battery strings St6, St7), and the W-phase battery strings (battery strings St8, St9) are Y-connected. The second power supply circuit 3 can therefore output AC power (more specifically, three-phase AC power) without using an inverter. This configuration reduces cost. In the second power supply circuit 3 according to the present embodiment, a plurality of battery strings connected in parallel is used as the AC battery strings of each phase. The larger the number of AC battery strings connected in parallel, the easier it is to finely adjust the AC power waveform output from the second power supply circuit 3. The number of AC battery strings in the second power supply circuit 3 is not limited to six, and can be changed as appropriate. The second power supply circuit 3 may include three AC battery strings, or may include one AC battery string. The second power supply circuit 3 may be configured to output single-phase AC power.

Referring back to FIG. 1, the AC power output from the first power supply circuit 2 is supplied to the electrical wires PGL via the insulation filter T1, the relay R1, and the distribution board C1. The AC power output from the second power supply circuit 3 is supplied to the electrical wires PGL via the insulation filter T2, the relay R2, and the distribution board C1. The power supply system 1 is configured to allow grid-connected operation in which three-phase AC power is reversely supplied from at least one of the first power supply circuit 2 and the second power supply circuit 3 to the power grid PG.

Each of the insulation filters T1, T2 includes, for example, an LCL filter and a three-phase transformer. Each of the insulation filters T1, T2 reduces the noise component of the three-phase AC power by the LCL filter, and converts the three-phase AC power to a predetermined voltage (e.g., 200 V) and insulates the input and output sides by the three-phase transformer. In the present embodiment, the inverters 11, 21, and 31 are reused products used for a different purpose (for driving an xEV), and their performance is not necessarily high. Therefore, the outputs of these inverters tend to contain noise. The insulation filter T1 disposed between the first power supply circuit 2 and the electrical wires PGL is configured to remove such noise. The insulation filter T1 may have a higher noise reduction capability than the insulation filter T2.

Each of the relays R1, R2 is, for example, an electromagnetic mechanical relay. The GCU 100 is configured to switch between connection (parallel-on) and disconnection (parallel-off) of the first power supply circuit 2 and the power grid PG by controlling ON and OFF of the relay R1. The GCU 100 is also configured to switch between connection (parallel-on) and disconnection (parallel-off) of the second power supply circuit 3 and the power grid PG by controlling ON and OFF of the relay R2.

The distribution board C1 supplies power from the power grid PG to each of the first power supply circuit 2 and the second power supply circuit 3. The distribution board C1 also supplies power from at least one of the first power supply circuit 2 and the second power supply circuit 3 to the power grid PG and/or the building 300 (distribution board C2). The AC power output from the first power supply circuit 2 and the AC power output from the second power supply circuit 3 together with the AC power output from the power grid PG are supplied to the electrical wires PGL and are further supplied to the wires in the building 300 via the distribution board C2.

The GCU 100 is configured to perform charging and discharging in a plurality of charge and discharge modes (first mode and second mode). The GCU 100 is configured to switch between the first mode and the second mode. In the first mode, power is transferred between an object to which power is to be supplied and the second power supply circuit 3, and is not transferred between the object and the first power supply circuit 2. In the first mode, the GCU 100 switches the relay R1 (first relay) to the OFF state (electrically disconnected state) and the relay R2 (second relay) to the ON state (electrically connected state). In the second mode, power is transferred between the object and each of the first power supply circuit 2 and the second power supply circuit 3. In the second mode, the GCU 100 switches both the relay R1 (first relay) and the relay R2 (second relay) to the ON state (electrically connected state). The power supply system 1 supplies power to the object (electrical wires PGL) or receives power supplied from the power grid PG connected to the electrical wires PGL in a selected charge and discharge mode out of the first and second modes.

Figure 10:
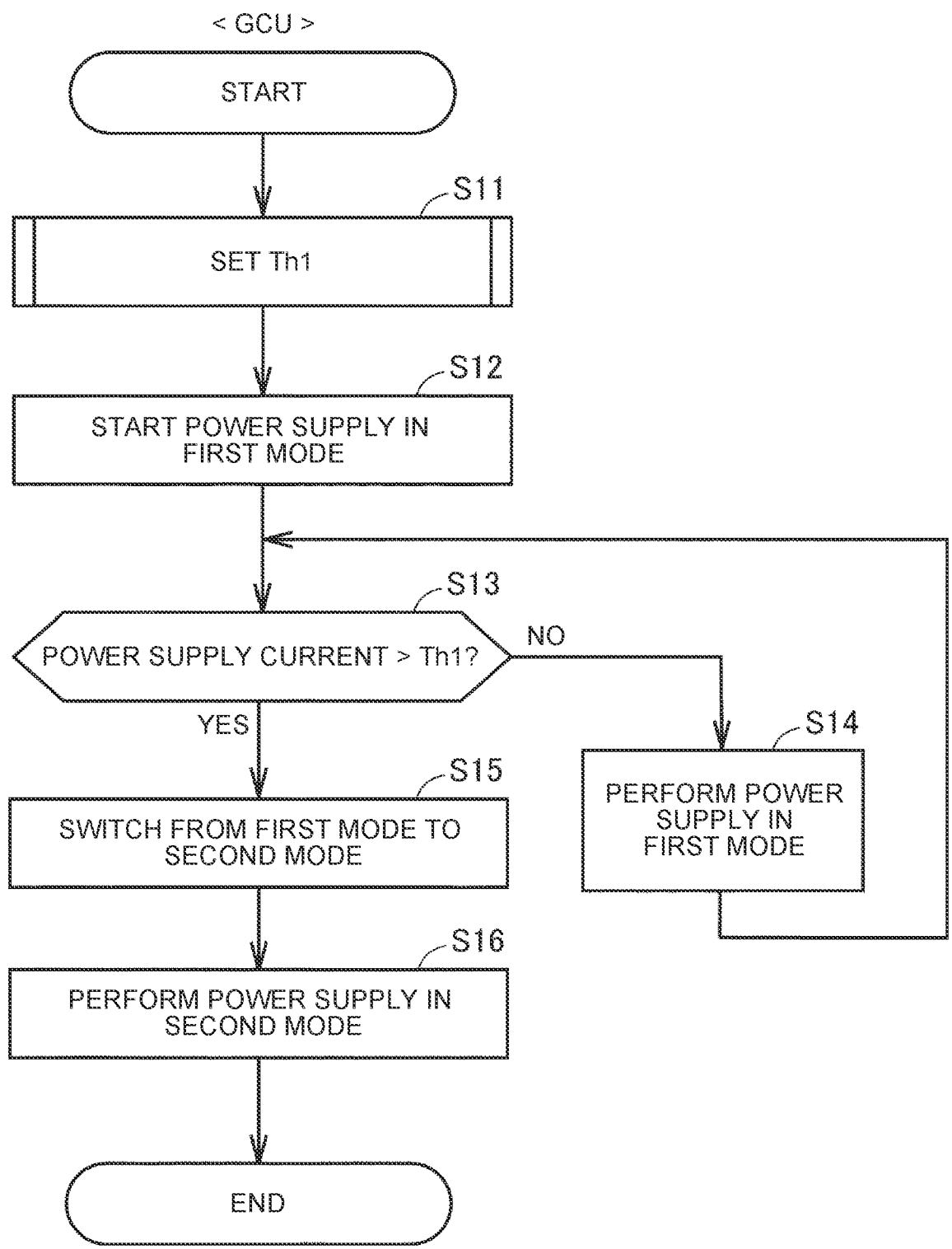
FIG. 10 is a flowchart showing an example of a process related to power supply start control that is performed by a group control unit (GCU) (control device) shown in FIG. 1.

FIG. 10 is a flowchart showing an example of a process related to power supply start control that is performed by the GCU 100. The process shown in this flowchart is started when a predetermined power supply start condition is satisfied. For example, the power supply start condition may be satisfied when the GCU 100 receives an instruction to start power supply from the user or the server 200. Hereinafter, each step in the flowchart is simply represented by "S".

Figure 11:
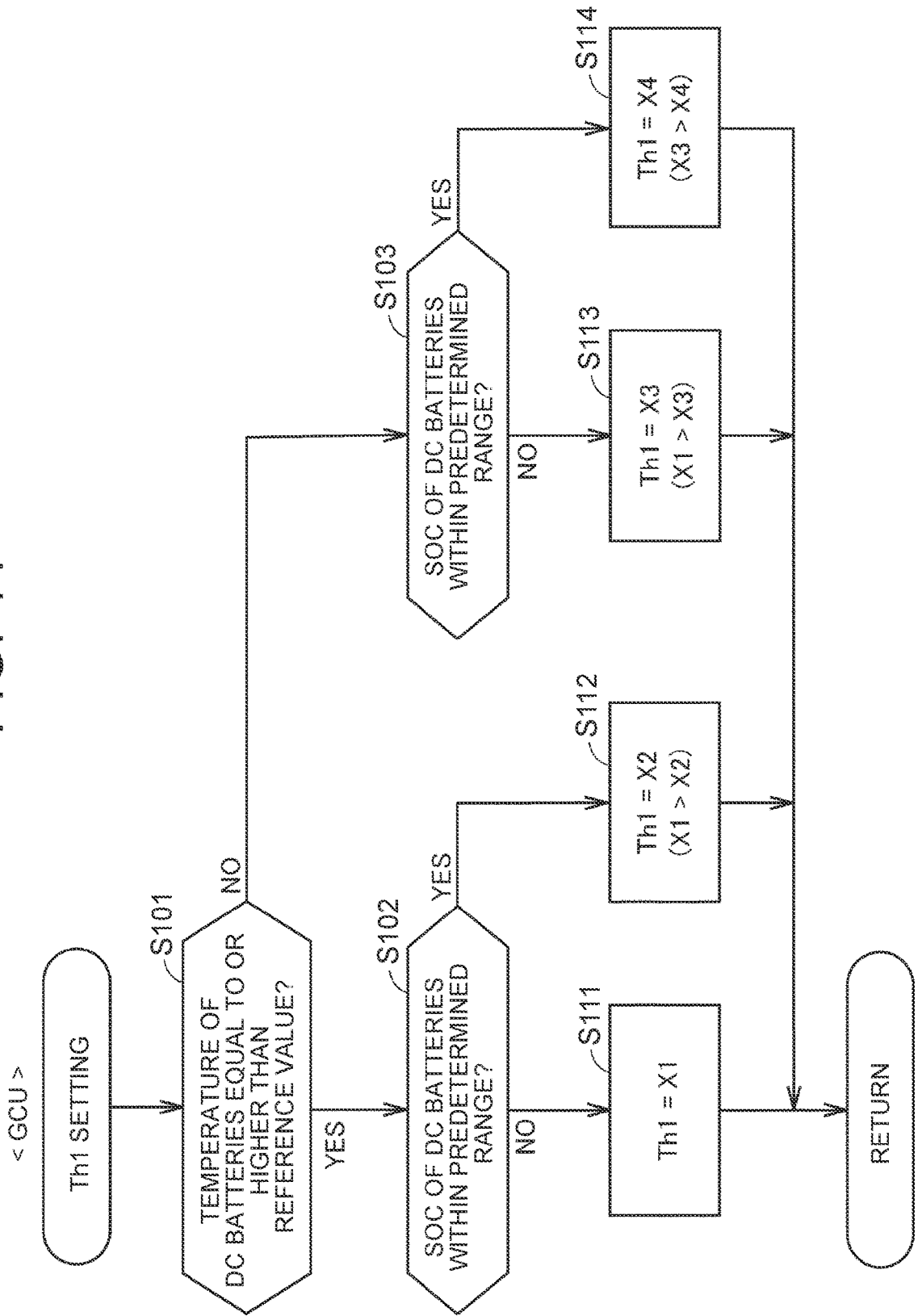
FIG. 11 is a flowchart showing details of a process of setting a first threshold in FIG. 10.

Referring to FIG. 10 together with FIGS. 1 and 2, the GCU 100 sets a first threshold (hereinafter indicated as "Th1") in S11. FIG. 11 is a flowchart showing details of S11 (Th1 setting process).

Referring to FIG. 11 together with FIGS. 1 and 2, the GCU 100 determines in S101 whether the temperature of the DC batteries (more specifically, a representative value that will be described later) is equal to or higher than a predetermined reference value. The reference value is the lower limit of a high temperature range in which the DC batteries tend to degrade. For example, the reference value may be set to a value experimentally obtained in advance by the user.

In the present embodiment, the batteries B included in the battery strings St1, St2, and St3 of the first power supply circuit 2 are the DC batteries. The temperature of each DC battery is detected by the corresponding monitoring unit BS (FIG. 2). The GCU 100 treats a representative value (e.g., average, median, or maximum value) of the detected temperatures of the DC batteries as the temperature of the DC batteries.

When the temperature of the DC batteries is equal to or higher than the reference value (YES in S101), the GCU 100 determines in S102 whether the SOC of the DC batteries (more specifically, a representative value that will be described later) is within a predetermined reference range. The reference range is the SOC range in which power supply can be performed without over-discharging the DC batteries. For example, the reference range may be set to a range experimentally obtained in advance by the user. An example of the reference range is an SOC range of 40% or more. In the present embodiment, the SOC of each DC battery is detected by the corresponding monitoring unit BS (FIG. 2). The GCU 100 treats a representative value (e.g., average, median, or maximum value) of the detected SOCs of the DC batteries as the SOC of the DC batteries. Even when the temperature of the DC batteries is lower than the reference value (NO in S101), the GCU 100 determines in S103 whether the SOC of the DC batteries is within the reference range. Step S103 is the same as step S102. The SOC of the DC batteries being out of the reference range means that the DC batteries may be over-discharged and degradation of the DC batteries may progress when the DC batteries are discharged.

When the temperature of the DC batteries is equal to or higher than the reference value and the SOC of the DC batteries is out of the reference range (YES in S101 and NO in S102), the GCU 100 sets Th1 to a predetermined value (hereinafter indicated as "X1") in S111. When the temperature of the DC batteries is equal to or higher than the reference value and the SOC of the DC batteries is within the reference range (YES in both S101 and S102), the GCU 100 sets Th1 to a predetermined value (hereinafter indicated as "X2") in S112. YES in S101 means that the temperature of the DC batteries is in the high temperature range in which the DC batteries tend to degrade.

When the temperature of the DC batteries is less than the reference value and the SOC of the DC batteries is out of the reference range (NO in both S101 and S103), the GCU 100 sets Th1 to a predetermined value (hereinafter indicated as "X3") in S113. When the temperature of the DC batteries is less than the reference value and the SOC of the DC batteries is within the reference range (NO in S101 and YES in S103), the GCU 100 sets Th1 to a predetermined value (hereinafter indicated as "X4") in S114.

X1 is the largest and X4 is the smallest among X1 to X4. X2 and X3 may be about the same. Alternatively, X2 may be larger than X3. Each of X1, X2, X3, and X4 may be expressed in C-rate of the first power supply circuit 2. For example, X1, X2, X3, and X4 may be 1.5 C, 1.2 C, 1.0 C, and 0.5 C, respectively. When Th1 is set in any one of S111 to S114, the series of steps shown in FIG. 11 ends, and the process proceeds to S12 in FIG. 10.

As described above, the GCU 100 is configured to set Th1 (first threshold) based on the temperature of the DC batteries and the SOC of the DC batteries. In the present embodiment, the first threshold is set by the process shown in FIG. 11. However, the process of setting the first threshold is not limited to the process shown in FIG. 11. The GCU 100 may set the first threshold corresponding to the temperature and SOC of the DC batteries using, for example, a map showing the relationship between the temperature and SOC of the DC batteries and the first threshold. The first threshold may be set in such a way that the higher the temperature of the DC batteries, the larger the first threshold. The first threshold may be set in such a way that the lower the SOC of the DC batteries, the larger the first threshold. Moreover, the GCU 100 may be configured to set Th1 (first threshold) based on only either the temperature of the DC batteries or the SOC of the DC batteries.

Referring back to FIG. 10 together with FIGS. 1 and 2, the GCU 100 starts power supply to the object in the first mode in S12. Specifically, the GCU 100 switches the relays R1, R2 to the OFF state and the ON state, respectively, and then outputs three-phase AC power (second AC power) from the second power supply circuit 3 to the electrical wires PGL. Thereafter, the GCU 100 determines in S13 whether a power supply current becomes larger than Th1. The power supply current is detected by the power sensor C1b. The process proceeds to S14 as long as the power supply current is equal to or less than Th1 (NO in S13). In S14, the GCU 100 continues the power supply in the first mode.

When the power supply current becomes larger than the first threshold (YES in S13), the GCU 100 switches the charge and discharge mode from the first mode to the second mode in S15. The GCU 100 then performs power supply to the object in the second mode in S16. Specifically, the GCU 100 switches both the relays R1, R2 to the ON state, and then outputs three-phase AC power (first AC power and second AC power) from both the first power supply circuit 2 and the second power supply circuit 3 to the electrical wires PGL.

The series of steps shown in FIG. 10 ends when the GCU 100 starts the power supply in the second mode in S16. This power supply in the second mode ends when a predetermined power supply stop condition is satisfied. The power supply in the second mode continues until the power supply stop condition is satisfied. When the power supply stop condition is satisfied, the GCU 100 stops output of the AC power from each of the first power supply circuit 2 and the second power supply circuit 3. For example, the power supply stop condition may be satisfied when the GCU 100 receives an instruction to stop power supply from the user or the server 200. However, the present disclosure is not limited to this, and the power supply stop condition can be set as desired.

The server 200 shown in FIG. 1 requests power balancing of the power grid PG to the GCU 100 as necessary. The server 200 may perform demand response (DR). By sending a command to the GCU 100, the server 200 remotely controls the input and output power of at least one of the first power supply circuit 2 and the second power supply circuit 3 so that the power balancing of the power grid PG is performed.

When the GCU 100 receives a command from the server 200 while the GCU 100 is in a state in which the remote control is allowed (hereinafter also referred to as "remote ON state"), the GCU 100 controls at least one of the first power supply circuit 2 and the second power supply circuit 3 according to the command from the server 200. Specifically, the command indicates an input and output current value. The input and output current value is an input current value or an output current value. When the command indicates an input current value, the GCU 100 controls the relays R1, R2 and at least one of the first power supply circuit 2 and the second power supply circuit 3 so that a current corresponding to the input current value is input from the power grid PG to the power supply system 1. When the command indicates an output current value, the GCU 100 controls the relays R1, R2 and at least one of the first power supply circuit 2 and the second power supply circuit 3 so that a current corresponding to the output current value is output from the power supply system 1 to the power grid PG.

On the other hand, when the GCU 100 receives a command from the server 200 while the GCU 100 is in a state in which the remote control is prohibited (hereinafter also referred to as "remote OFF state"), the GCU 100 will not accept the command from the server 200. The state of the GCU 100 regarding the remote control (remote ON state or remote OFF state) may be switched according to settings by the user.

Figure 12:
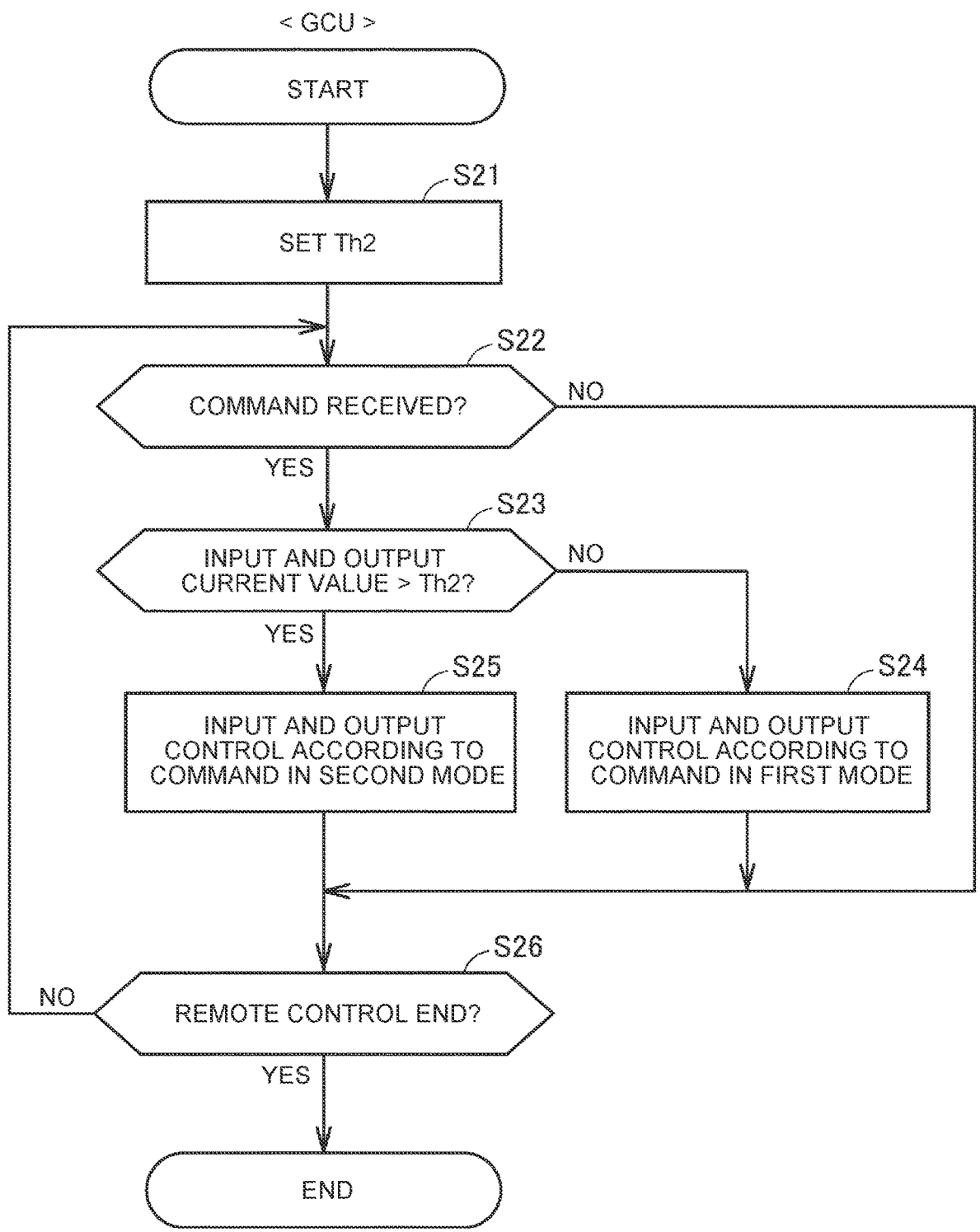
FIG. 12 is a flowchart showing an example of a process that is performed by the GCU (control device) in a remote ON state in the power supply system shown in FIG. 1.

FIG. 12 is a flowchart showing an example of a process that is performed by the GCU 100 in the remote ON state. The process shown in this flowchart is started when the GCU 100 switches from the remote OFF state to the remote ON state.

Referring to FIG. 12 together with FIGS. 1 and 2, the GCU 100 sets a second threshold (hereinafter indicated as "Th2") in S21. A method for setting Th2 may be a method according to the method for setting Th1 described above (see FIG. 11). In the remote control, however, not only discharging but also charging may be performed. Therefore, the reference range for setting Th2 (see S102 and S103 in FIG. 11) is the SOC range in which charging and discharging can be performed without over-charging and over-discharging the DC batteries. An example of such a reference range is an SOC range of 40% or more and 75% or less.

In the subsequent step S22, the GCU 100 determines whether it has received a command from the server 200. When the GCU 100 has not received a command from the server 200 (NO in S22), the process proceeds to S26. In S26, the GCU 100 determines whether a remote control end condition is satisfied. When the remote control end condition is not satisfied (NO in S26), the process returns to S22. For example, the remote control end condition is satisfied when the GCU 100 switches to the remote OFF state. The remote control end condition may also be satisfied when the GCU 100 receives an end notification from the server 200. However, the present disclosure is not limited to this, and the remote control end condition can be set as desired.

When the GCU 100 receives the command (YES in S22), the GCU 100 determines in S23 whether the input and output current value indicated by the command is larger than Th2. When the input and output current value indicated by the command is equal to or less than Th2 (NO in S23), the GCU 100 performs input and output control according to the command in the first mode in S24. Specifically, the GCU 100 stops output of the AC power from the first power supply circuit 2, switches the relays R1, R2 to the OFF state and the ON state, respectively, and then controls the second power supply circuit 3 so that the input and output current value of the second power supply circuit 3 becomes equal to the input and output current value indicated by the command. When the input and output current value indicated by the command is larger than Th2 (YES in S23), the GCU 100 performs input and output control according to the command in the second mode in S25. Specifically, the GCU 100 switches both of the relays R1, R2 to the ON state, and then controls the first power supply circuit 2 and the second power supply circuit 3 so that the sum of the input and output current value of the first power supply circuit 2 and the input and output current value of the second power supply circuit 3 becomes equal to the input and output current value indicated by the command. The input and output current value of the first power supply circuit 2 and the input and output current value of the second power supply circuit 3 are detected by the power sensors C1*a*, C1*b*, respectively. In the process shown in FIG. 12, the process proceeds to S24 when the input and output current value indicated by the command is equal to Th2. However, the process may be modified so that the process proceeds to S25 rather than to S24 when the input and output current value indicated by the command is equal to Th2.

When the GCU 100 performs the input and output control according to the command in S24 or S25, the process proceeds to S26. The remote control according to the command from the server 200 (S22 to S25) is continued as long as the remote control end condition is not satisfied (NO in S26). The series of steps shown in FIG. 12 ends when the remote control end condition is satisfied (YES in S26).

The power supply system 1 may perform power balancing of the power grid PG by local control that is not based on an external command. The GCU 100 may acquire a charge and discharge plan for power balancing of the power grid PG in advance from the server 200. The charge and discharge plan is information instructing a charge and discharge profile (that is, a trend on input and output power of the power supply system 1 from and to the power grid PG) in a predetermined period. The GCU 100 may control the input and output power of at least one of the first power supply circuit 2 and the second power supply circuit 3 according to the charge and discharge plan when the start time of the charge and discharge plan comes.

Figure 13:
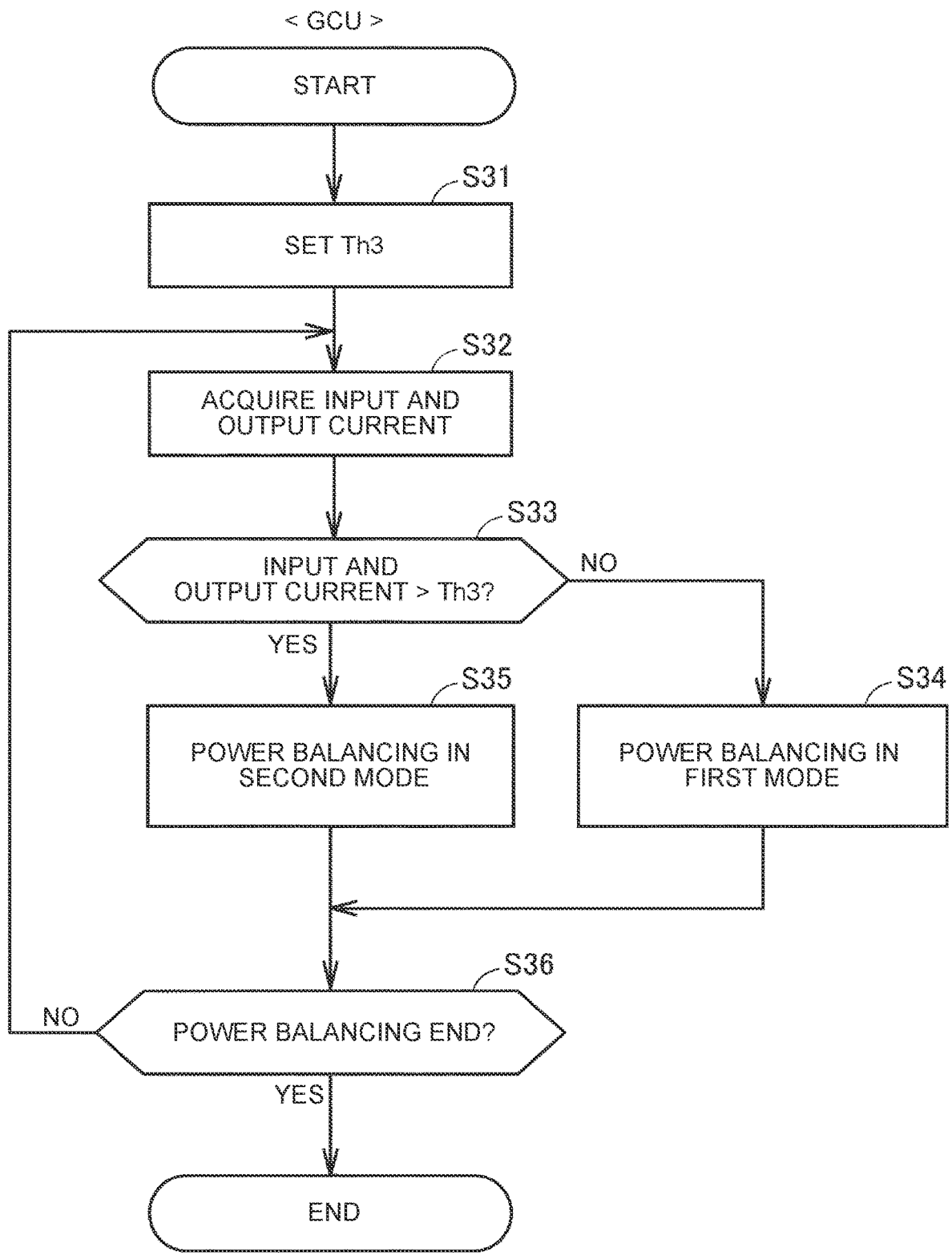
FIG. 13 is a flowchart showing an example of a process that is performed when the GCU (control device) in FIG. 1 performs power balancing according to a predetermined charge and discharge plan.

FIG. 13 is a flowchart showing an example of a process that is performed when the GCU 100 performs power balancing according to a predetermined charge and discharge plan. The process shown in this flowchart is started when the start time of the charge and discharge plan comes.

Referring to FIG. 13 together with FIGS. 1 and 2, the GCU 100 sets a third threshold (hereinafter indicated as "Th3") in S31. A method for setting Th3 may be a method according to the method for setting Th1 described above (see FIG. 11). In the power balancing, however, not only discharging but also charging may be performed. Therefore, the reference range for setting Th3 (see S102 and S103 in FIG. 11) is the SOC range in which charging and discharging can be performed without over-charging and over-discharging the DC batteries. An example of such a reference range is an SOC range of 40% or more and 75% or less.

In the subsequent step S32, the GCU 100 acquires the input and output current of the power supply system 1. In the present embodiment, the sum of the input and output current value of the first power supply circuit 2 detected by the power sensor C1*a* and the input and output current value of the second power supply circuit 3 detected by the power sensor C1*b* corresponds to the input and output current of the power supply system 1.

In S33, the GCU 100 determines whether the input and output current of the power supply system 1 acquired in S32 is larger than Th3. When the input and output current of the power supply system 1 is equal to or less than Th3 (NO in S33), the GCU 100 performs input and output control according the charge and discharge plan in the first mode in S34. Specifically, the GCU 100 stops output of the AC power from the first power supply circuit 2, switches the relays R1, R2 to the OFF state and the ON state, respectively, and then controls the second power supply circuit 3 so that the input and output current value of the second power supply circuit 3 becomes equal to the input and output current value indicated by the charge and discharge plan. Through this control, power balancing of the power grid PG is performed by the input and output power of the second power supply circuit 3. On the other hand, when the input and output current of the power supply system 1 is larger than Th3 (YES in S33), the GCU 100 performs input and output control according to the charge and discharge plan in the second mode in S35. Specifically, the GCU 100 switches both of the relays R1, R2 to the ON state, and then controls the first power supply circuit 2 and the second power supply circuit 3 so that the sum of the input and output current value of the first power supply circuit 2 and the input and output current value of the second power supply circuit 3 becomes equal to the input and output current value indicated by the charge and discharge plan. Through this control, power balancing of the power grid PG is performed by both the input and output power of the first power supply circuit 2 and the input and output power of the second power supply circuit 3. In the process shown in FIG. 13, the process proceeds to S34 when the input and output current of the power supply system 1 is equal to Th3. However, the process may be modified so that the process proceeds to S35 rather than to S34 when the input and output current of the power supply system 1 is equal to Th3.

When the GCU 100 performs the input and output control according to the charge and discharge plan in S34 or S35, the process proceeds to S36. In S36, the GCU 100 determines whether a power balancing end condition is satisfied. The power balancing end condition is satisfied when the end time of the charge and discharge plan comes. The power balancing end condition may also be satisfied when the GCU 100 receives an end notification from the server 200. The input and output control according to the charge and discharge plan (S32 to S35) is continued as long as the power balancing end condition is not satisfied (NO in S36). The series of steps shown in FIG. 13 ends when the power balancing end condition is satisfied (YES in S36).

As described above, the power supply system 1 according to the present embodiment is configured to output AC power to the object to which power is to be supplied (electrical wires PGL). The power supply system includes the first power supply circuit 2, the second power supply circuit 3, and the GCU 100 (control device). The first power supply circuit 2 includes the DC battery strings for DC power (battery strings St1, St2, and St3), and the inverters that convert DC power output from the DC battery strings to AC power (inverters 11, 21, and 31). The first power supply circuit 2 is configured to output the first AC power using the DC battery strings and the inverters. The second power supply circuit 3 includes the AC battery strings for AC power (battery strings St4 to St9), and is configured to output the second AC power using the AC battery strings. The GCU 100 is configured to control the first power supply circuit 2 and the second power supply circuit 3. Each of the AC battery strings and the DC battery strings includes multiple battery circuit modules M connected in series. Each of the battery circuit modules M includes: the battery B; the output terminals OT1, OT2 that output the voltage of the battery B; the first switch (SW 51) connected to the output terminals OT1, OT2 and connected in parallel with the battery B; and the second switch (SW 52) connected in series with the battery B. Each of the battery circuit modules M is configured so that the voltage of the battery B is applied between the output terminals OT1, OT2 when the first switch is in the electrically disconnected state and the second switch is in the electrically connected state (see FIG. 2). The GCU 100 is configured to start supplying the second AC power to the object in the first mode, and when the power supply current becomes larger than the first threshold, switch from the first mode to the second mode and supply the first AC power and the second AC power to the object in the second mode (see FIG. 10). Such a power supply system 1 can suitably perform both low-rate power supply and high-rate power supply. Since the DC battery strings are not used for the low-rate power supply, degradation of the DC batteries included in the DC battery strings is reduced.

In the present embodiment, the power density of the batteries in the DC battery strings is higher than the power density of the batteries in the AC battery strings. The energy density of the batteries in the AC battery strings is higher than the energy density of the batteries in the DC battery strings. The power supply system 1 according to the present embodiment uses high capacity batteries for the low-rate power supply. This makes it easier for the power supply system 1 to perform such power supply for a long time. Moreover, the power supply system 1 according to the present embodiment uses high power batteries for the high-rate power supply. This makes it easier for the power supply system 1 to suitably perform the high-rate power supply. A combination of the high capacity batteries and the high power batteries reduces the required number of batteries and reduces battery cost as compared to using only the high-capacity batteries to provide the same power supply capability.

The building 300 may be equipped with power generation equipment (e.g., variable renewable energy source such as solar power generation equipment or wind power generation equipment). The power supply system 1 may be configured to store surplus power generated by the power generation equipment in a predetermined battery string. The power supply system 1 may be configured to output power from a predetermined battery string to the building 300 in response to a request from the building 300.

The embodiment disclosed herein should be considered to be illustrative and not restrictive in all respects. The scope of the present disclosure is shown by the scope of claims rather than by the above description of the embodiment, and is intended to include all modifications within the meaning and scope equivalent to the scope of claims.

What is claimed is:

1. A power supply system that outputs alternating-current power to an object to which power is to be supplied, the power supply system comprising:
 a first power supply circuit including a direct-current battery string for direct-current power and an inverter that converts direct-current power output from the direct-current battery string to alternating-current power, the first power supply circuit being configured to output first alternating-current power by the direct-current battery string and the inverter;

a second power supply circuit including an alternating-current battery string for alternating-current power, the second power supply circuit being configured to output second alternating-current power by the alternating-current battery string; and a control device configured to control the first power supply circuit and the second power supply circuit, wherein:

the alternating-current battery string and the direct-current battery string each include multiple battery circuit modules connected in series;

each of the battery circuit modules includes
a battery,
an output terminal that outputs a voltage of the battery,
a first switch connected to the output terminal and connected in parallel with the battery, and
a second switch connected in series with the battery;

each of the battery circuit modules is configured in such a manner that the voltage of the battery is applied to the output terminal when the first switch is in an electrically disconnected state and the second switch is in an electrically connected state;

the control device is configured to switch between a first mode and a second mode, the first mode being a mode in which power is transferred between the object and the second power supply circuit and is not transferred between the object and the first power supply circuit, and the second mode being a mode in which power is transferred between the object and each of the first power supply circuit and the second power supply circuit; and the control device is configured to start supplying the second alternating-current power to the object in the first mode, and when a power supply current becomes larger than a first threshold, switch from the first mode to the second mode and supply the first alternating-current power and the second alternating-current power to the object in the second mode.

2. The power supply system according to claim 1, wherein:

a power density of the battery included in the direct-current battery string is higher than a power density of the battery included in the alternating-current battery string; and an energy density of the battery included in the alternating-current battery string is higher than an energy density of the battery included in the direct-current battery string.

3. The power supply system according to claim 2, wherein the control device is configured to set the first threshold based on at least one of a temperature of the battery included in the direct-current battery string and a state of charge of the battery included in the direct-current battery string.

4. The power supply system according to claim 1, wherein:

the control device is configured to control at least one of the first power supply circuit and the second power supply circuit according to an external command;

when an input and output current value indicated by the external command is smaller than a second threshold, the control device controls the second power supply circuit in the first mode in such a manner that an input and output current value of the second power supply circuit becomes equal to the input and output current value indicated by the external command; and when the input and output current value indicated by the external command is larger than the second threshold, the control device controls the first power supply circuit and the second power supply circuit in the second mode in such a manner that a sum of an input and output current value of the first power supply circuit and the input and output current value of the second power supply circuit becomes equal to the input and output current value indicated by the external command.

5. The power supply system according to claim 1, wherein:

the object is an electrical wire connecting a building and an external power supply that supplies power to the building; and the first power supply circuit and the second power supply circuit are each configured to supply and receive power to and from the external power supply.

6. The power supply system according to claim 5, wherein:

the control device is configured to perform power balancing of the external power supply;

when an input and output current of the power supply system is smaller than a third threshold, the control device controls the second power supply circuit in the first mode so as to perform the power balancing of the external power supply by input and output power of the second power supply circuit; and when the input and output current of the power supply system is larger than the third threshold, the control device controls the first power supply circuit and the second power supply circuit in the second mode so as to perform the power balancing of the external power supply by both input and output power of the first power supply circuit and the input and output power of the second power supply circuit.

7. The power supply system according to claim 1, further comprising:

a first relay located between the first power supply circuit and the object; and a second relay located between the second power supply circuit and the object, wherein the control device is configured to switch the first relay to an electrically disconnected state and the second relay to an electrically connected state in the first mode, and switch both the first relay and the second relay to the electrically connected state in the second mode.

8. The power supply system according to claim 1, wherein:

the first power supply circuit includes a first drive circuit and a first control circuit, the first drive circuit driving the first switch and the second switch included in the direct-current battery string, and the first control circuit sending a signal for driving each of the first switch and the second switch to the first drive circuit according to a command from the control device; and the second power supply circuit includes a second drive circuit and a second control circuit, the second drive circuit driving the first switch and the second switch included in the alternating-current battery string, and the second control circuit sending a signal for driving each of the first switch and the second switch to the second drive circuit according to a command from the control device.

9. The power supply system according to claim 8, wherein:
 the inverter is a three-phase inverter;
 the control device is configured to send a command for controlling the direct-current battery string to the first control circuit and control the inverter such that three-phase alternating-current power is output from the first power supply circuit;
 the alternating-current battery string includes a U-phase battery string, a V-phase battery string, and a W-phase battery string that are Y-connected; and
 the control device is configured to send a command for controlling the U-phase battery string, the V-phase battery string, and the W-phase battery string to the second control circuit such that three-phase alternating-current power is output from the second power supply circuit.

10. The power supply system according to claim 1, further comprising an insulation filter located between the first power supply circuit and the object, wherein the inverter is a reused product used for a different purpose.

11. The power supply system according to claim 8, wherein:
 the first drive circuit and the second drive circuit each include a delay circuit that delays the signal; and
 delay time of the signal that is provided by the delay circuit is set by the control device.

* * * * *